United States Patent [19]

Yokozawa

[11] Patent Number: 4,890,173
[45] Date of Patent: Dec. 26, 1989

[54] DIGITAL SIGNAL REPRODUCING APPARATUS WITH CAPSTAN SERVO CONTROL BASED ON ADJACENT TRACK PILOT SIGNAL CROSSTALK ADJUSTMENT

[75] Inventor: Seiichi Yokozawa, Saitama, Japan

[73] Assignee: Pioneer Electronic Corporation, Tokyo, Japan

[21] Appl. No.: 72,822

[22] Filed: Jul. 13, 1987

[30] Foreign Application Priority Data

Jul. 11, 1986 [JP] Japan ................. 61-162086

[51] Int. Cl.$^4$ .............. G11B 5/584; G11B 5/09; G11B 15/467
[52] U.S. Cl. ................. 360/77.15; 360/18; 360/32; 360/73.09
[58] Field of Search ............ 360/8, 9.1, 10.2, 10.3, 360/18, 19.1, 21, 27, 32, 64, 70, 73, 77, 73.04, 73.09, 73.11, 73.12, 73.13, 73.14, 77.12–77.17, 77.01, 77.02, 77.07–77.11

[56] References Cited

U.S. PATENT DOCUMENTS

| | | | |
|---|---|---|---|
| 4,651,239 | 3/1987 | Omori et al. | 360/77 |
| 4,656,539 | 4/1987 | Sugiki et al. | 360/77 |
| 4,714,971 | 12/1987 | Sigiki et al. | 360/77 |
| 4,739,420 | 4/1988 | Odaka et al. | 360/77 |
| 4,748,520 | 5/1988 | Odaka | 360/77 |
| 4,755,893 | 7/1988 | Yamada et al. | 360/77 |

Primary Examiner—Aristotelis M. Psitos
Assistant Examiner—Steven R. Garland
Attorney, Agent, or Firm—Sughrue, Mion, Zinn, Macpeak & Seas

[57] ABSTRACT

A digital signal reproducing apparatus which reproduces digital PCM audio signals recorded on a recording medium in the form of single helical tracks. The apparatus is provided with at least two rotary heads for reproducing a plurality of signals on the recording medium. When there are variations in the performance of the rotary heads or in the conditions under which they are mounted on a drum, the apparatus is capable of performing control by a capstan servo in equal amounts for its heads based on the difference between the levels of crosstalk of pilot signals from the two tracks adjacent to the track being scanned (i.e., on-track) by the individual heads and without requiring any cumbersome adjusting operations if the heads are deviated in the same amounts with respect to the track being scanned. The adjustment of the levels of crosstalk is implemented using either a gain variable amplifier circuit or an analog divider circuit. In the amplifier circuit, as the on-track pilot signal increases, the gain of an amplifier decreases so that a smaller difference between the levels of crosstalk of pilot signals from the two adjacent tracks is produced. The analog divider circuit performs a division using the difference between the levels of crosstalk of the pilot signals of the two adjacent tracks used as a numerator and the output level of the pilot signal on the on-track used as a denominator.

7 Claims, 13 Drawing Sheets

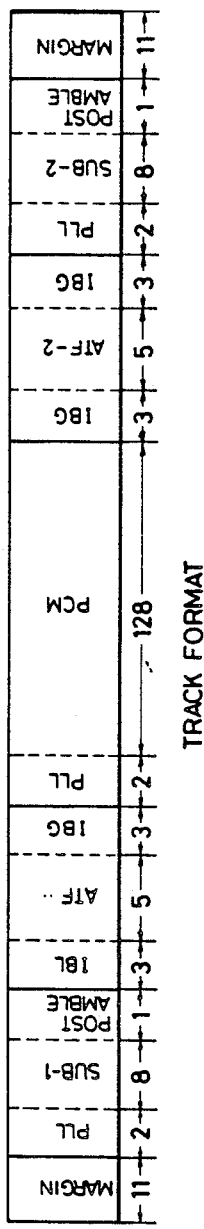
FIG. 13(a) TRACK FORMAT
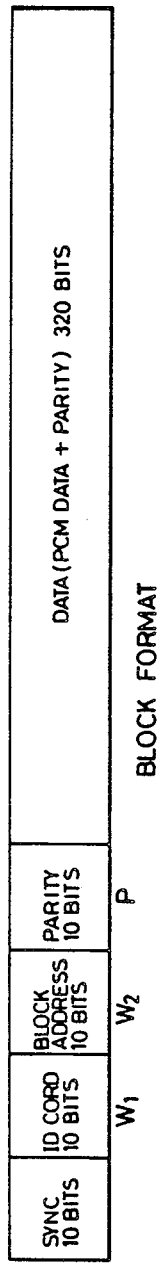
FIG. 13(b) BLOCK FORMAT
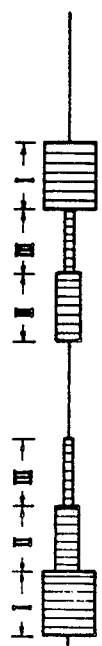
FIG. 15(a)
FIG. 15(b)
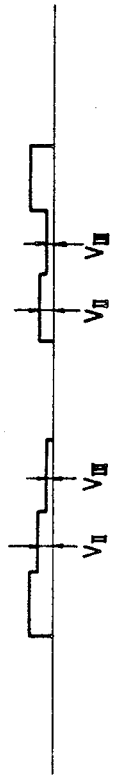
FIG. 15(c)

DIGITAL SIGNAL REPRODUCING APPARATUS WITH CAPSTAN SERVO CONTROL BASED ON ADJACENT TRACK PILOT SIGNAL CROSSTALK ADJUSTMENT

BACKGROUND OF THE INVENTION

The present invention relates to a digital signal reproducing apparatus suitable for reproducing digital PCM audio signals that have been recorded in the form of single helical tracks on a recording medium, one track being formed per unit time, with a rotary head.

A technique is known in which audio signals are recorded on magnetic tape with a helical scanning rotary head in the form of helical tracks, one track being formed per unit time, and reproduced thereafter. A digital signal record/reproduce apparatus known as R-DAT (rotary head type digital audio tape recorder) has been designated for recording audio signals as PCM signals and thereafter reproducing the same.

A format of tracks to be recorded in the actual R-DAT system has a pattern as shown in FIG. 13(a), in which each of MARGIN, PLL and POSTAMBLE has a frequency or $\frac{1}{2}$ $f_M$ ($f_M$=9.4 MHz) and IBG a frequency of 1/6 $f_M$. Each of SUB-1, SUB-2 and PCM is composed of a plurality of blocks as shown in FIGS. 13(a) and 13(b). SYNC is composed of 10 bits, 9 of which are fixed with the remainder assuming various patterns depending upon the place and audio signals. SUB consists of a cyclic pattern of 8 such blocks, and PCM 128 blocks. The numerals given in FIG. 13(a) represent the numbers of blocks occupied by the respective regions. ATF-1 between SUB-1 and PCM and ATF-2 between PCM and SUB-2 are each a region (ATF=automatic track finding) provided for ensuring that tracking control i.e., control for allowing a rotary head to correctly scan the recorded tracks during reproduction, can be accomplished by means of the output of the head without employing any special head.

In R-DAT, PCM signals compressed on a time base are recorded in the form of helical tracks on magnetic tape by means of two rotary heads. Instead of providing a guard band between adjacent tracks, a tracking pilot signal is recorded both at the beginning and at the end of each track in a region independent of the area in which the PCM signals are recorded. During reproduction, the recorded tracks are scanned with a rotary head having a scanning width larger than the width of each track, and the reproduction output of the pilot signals from the two tracks adjacent to the track being scanned is used to control the tracking of the rotary head.

The track pattern for ATF is specified as shown in FIG. 14 and is hereinafter described with reference to the case where a drum having a diameter of 30 mm is rotating at 2,000 rpm with the tape wound at an angle of 90° to the drum.

ATF-1 and ATF-2 located in the front and rear portions, respectively, of each track have a low-frequency (small azimuth-effect) signal $f_1$ as a tracking pilot signal. This signal is used for the purpose of detecting the levels of crosstalk resulting from the two tracks adjacent to the track being reproduced, so as to obtain the difference between the levels of such crosstalk as a tracking error signal. A low-frequency signal of $f_M/72$ (130 kHz) is used as the pilot signal $f_1$.

In each of ATF-1 and ATF-2 is recorded a sync signal for identifying the location at which the pilot signal $f_1$ is recorded. In the presence of crosstalk, the sync signal is unable to distinguish the on-track from adjacent tracks, so it is selected in such a way that it not only has a frequency capable of producing an azimuth-effect but also affords a pattern that is not possessed by the PCM signal. If the head having a+(plus) azimuth is designated A and the head having a−(minus) azimuth as B, two different sync signals are provided for the purpose of distinguishing head A from head B. Stated more specifically, a sync 1 signal $f_2$ having a frequency of $f_M/18$ (=522 kHz) and a sync 2 signal $f_3$ having a frequency of $f_M/12$ (=784 kHz), as associated for heads A and B, respectively, are recorded in predetermined positions.

In R-DAT which does not employ an erase head, a new signal is written over the previously recorded signal. In order to enable this "overwrite" mode, an erase signal $f_4$ having a frequency of $f_M/6$ (1.56 MHz) is recorded at a predetermined position for erasing the previously recorded pilot signal $f_1$, sync 1 signal $f_2$, and sync 2 signal $f_2$.

The pilot signals for ATF are located at different positions on the on-track and the two adjacent tracks and the level of the pilot signal on the on-track (i.e., the track being scanned) differs on a time basis from the level of each of the pilot signals on the adjacent tracks, so that the three different levels can be sampled independently of each other.

Five blocks are assigned to each of the ATF regions, ATF-1 and ATF-2, and the pilot signal $f_1$ is recorded in two of the five blocks of each of the ATF regions. The sync signal $f_2$ is recorded in an area covering 1 or 0.5 blocks beginning at the center of the position in which the pilot signal $f_1$ of one of the two adjacent tracks is recorded. The pilot signal $f_1$ on the other adjacent track is recorded in such a way that its center is positioned two blocks after the beginning of the sync signal recorded on the on-track. A sync signal composed of one block is assigned to an odd-number frame, and a sync signal composed of 0.5 blocks is assigned to an even-number frame.

As described above, the sync signals to be recorded in the ATF region have different frequencies depending upon which head is used in scanning, and these sync signals also have different recording lengths in odd-number frames and even-number frames. This design enables four consecutive tracks to be distinguished from one another since they are provided with different ATF regions. The pattern of ATF regions is of the a 4-track completed type in which it is cyclically repeated for every 4 tracks.

When magnetic tape in which signals have been recorded in the format shown in FIG. 13(a) is played back with a rotary head, an RF signal of the type shown in FIG. 15(a) is reproduced from the head. If this RF signal is obtained by playback of a track with the odd-number frame (A) shown in FIG. 14, it may be passed through a bandpass filter (BPF) of 130 kHz so as to obtain a pilot signal $f_1$ as shown in FIG. 15(b).

The signal in zone I is due to the pilot signal on the on-track, and those in zones II and III result from the crosstalk of the pilot signal on a track with the odd-number frame (B) and a track with the even-number frame (B), respectively. If the rotary head were scanning the on-track correctly, the envelope levels of zones II and III, or the values of $V_{II}$ and $V_{III}$ indicated in FIG. 15(c) should be equal to each other. However, if a tracking deviation occurs, $V_{II}$ is not equal to $V_{III}$ ($V_{II} \neq$ $V_{III}$) and the amount and direction of the deviation of the rotary head with respect to the on-track can be determined by the magnitude and polarity of the difference between $V_{II}$ and $V_{III}$. Therefore, by actuating a capstan servo according to the difference between $V_{II}$ and $V_{III}$ so as effect fine adjustment of the tape speed, the rotary head can be controlled to travel correctly on the on-track.

In practice, however, the performance of head A differs from head B and the condition under which one head is mounted on the drum also differs from the condition of mounting the other head. If such variations exist, the level of the reproduction with head A differs from the level for head B and as a result, the level of crosstalk of pilot signals comes to vary from one head to the other. This difference in the output level of crosstalk from the rotary heads causes the error signals for ATF tracking to vary from one reproduction head to the other, resulting in an exaggerated variation in the tracking error signal. This can be explained more specifically as follows: even if the two heads A and B have the same amount of mechanical deviation with respect to the tracks with which that come in contact for reproduction, the difference between the levels of crosstalk of pilot signals from the two tracks adjacent to the track being scanned fails to assume the same value for each head (this difference should inherently assume the same level for each head) if the two heads produce different output levels, and the capstan servo will act in different ways for each change of heads. As a consequence, control performed on one head in a certain direction may sometimes cause a greater amount of tracking deviation for the other head.

This problem could be solved by compensating for the tracking deviation with an offset being introduced in the tracking error signal for each head, but this presents a great bottleneck in commercial production of DAT systems because an extra job of adjustment is necessary for setting a proper amount of offset for individual systems.

SUMMARY OF THE INVENTION

The present invention has been accomplished in order to eliminate the aforementioned problems of the prior art DAT system. A principal object, therefore, of the present invention is to provide a digital signal reproducing apparatus which, even if there are variations in the performance of a plurality of rotary heads or in the conditions under which they are mounted on the drum, is capable of performing control by a capstan servo in equal amounts for the heads based on the difference between the levels of crosstalk of pilot signals from the two tracks adjacent to the track being scanned by the individual heads and without requiring any cumbersome adjusting operations if the heads are deviated in the same amounts with respect to the track being scanned.

The digital signal reproducing apparatus of the present invention that has been developed to attain the aforementioned object has at least two rotary heads for reproducing a plurality of signals on a recording medium, said plurality of signals containing a digital signal formed by performing PCM and time-base compression on an audio signal and a tracking pilot signal composed of a frequency signal with a small azimuth-effect, said plurality of signals being recorded on each of a plurality of helical tracks in a predetermined format with the recording region in one track being independent of the recording region in another track in the longitudinal direction, the positions of the pilot signals recorded on three consecutive tracks differing from one track to another, each of said rotary heads having a width greater than the width of each track on which it scans, and a capstan servo being controlled by the difference between the levels of crosstalk of the pilot signals that are picked up by said rotary heads from the two tracks adjacent to the on-track being reproduced. This apparatus is characterized by including means for sampling and holding the level of the pilot signal that is picked up by the rotary heads from the on-track, and level adjusting means for adjusting the difference between the levels of crosstalk of pilot signals from said two adjacent tracks with reference to said held level and thereafter outputting the adjusted level difference, which is used as a reference for performing control on the capstan servo.

In the course of the studies conducted in order to attain the object described above, the present inventors noted that the output level of each rotary head appears not only in the level of the crosstalk of pilot signals from the two tracks adjacent to the on-track being scanned but also in the level of the pilot signal on the on-track. Based on the level of this pilot signal on the on-track, the difference between the levels of crosstalk of pilot signals from the two adjacent tracks is adjusted in such a way as to compensate for the variation in the difference in crosstalk levels due to the difference in output level for each rotary head. The system of the present invention has a simple construction and yet attains the intended compensation without employing any cumbersome adjusting operations.

BRIEF DESCRIPTION OF THE DRAWINGS

FIGS. 13(a) and (13b) show a track format, respectively, and a block format used in R-DAT;

FIGS. 15(a), 15(b), and 15(c) are diagrams illustrating the principle of tracking control with the track pattern shown in FIG. 14.

PREFERRED EMBODIMENT OF THE INVENTION

A preferred embodiment of the present invention is hereinafter described with reference to the accompanying drawings.

Figure 1:
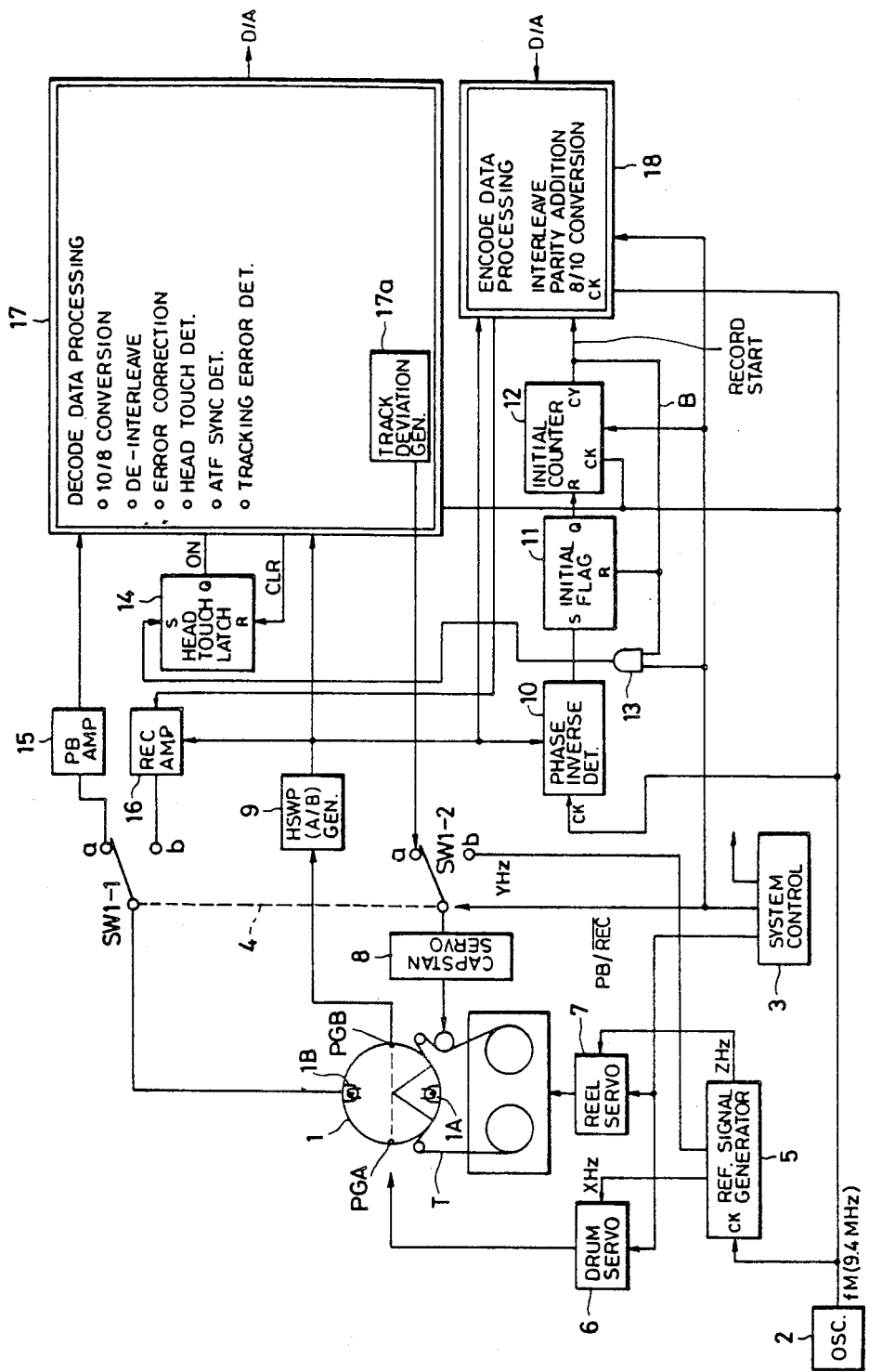
FIG. 1 is a system block diagram showing the general layout of a digital signal reproducing apparatus according to one embodiment of the present invention.

FIG. 1 is a system block diagram showing an apparatus according to one embodiment of the present invention that is configured as a digital signal record/reproduce apparatus. In the figure, 1 is a rotary drum having a diameter of 30 mm that is equipped with two rotary heads spaced apart by 180°, one being A head 1A for recording and reproducing (+) azimuth and the other being B head 1B for recording and reproducing (−) azimuth. At the midpoint on one semicircumference between head 1A and head 1B, one pulse generator (PG) PGA is provided, and at the midpoint on the other semicircumference between the two heads is provided another pulse generator PGB.

The numeral 2 signifies a crystal oscillator that generates a basic clock $f_M$ having a frequency of 9.4 MHz, with the basic clock $f_M$ being supplied to various parts of the system.

The numeral 3 signifies a system controller that outputs a PB/REC switching signal for performing such operations as on-off control on a toggle switch unit 4 composed of switches SW1 and SW2.

The numeral 5 denotes a reference signal generator which, in response to the basic clock $f_M$ fed to its CK input, generates reference signals having frequencies of X Hz (66 Hz assuming the use of 2 PGs), Y Hz (which varies according to the number of PGs in the capstan motor), and Z Hz.

The numeral 6 denotes a drum servo that is controlled by system controller 3 and which, in response to the reference signal X Hz, performs servo control on the rotation of a drum motor; 7 is a reel servo that is also controlled by the system controller 3 and which, in response to the reference signal Z Hz, performs servo control on the rotation of a reel motor; 8 is a capstan servo that is also controlled by the system controller 3 and which performs servo control on the rotation of a capstan motor either in response to the reference signal Y Hz in a recording mode where the switch 4 is placed on the side of contact b or on the basis of the amount of tracking deviation in a playback mode where the switch 4 is on the side of contact a.

The numeral 9 signifies an HSWP (A/B) signal generator which, in response to the pulses from the two PGs on the drum 1, generates an HSWP (A/B) signal for switching A head 1A to B head 1B or vice versa, and the HSWP (A/B) signal which assumes a high (H) level when A head is scanning and a low level (L) when B head is scanning is supplied to various parts of the system.

The numeral 10 signifies a phase inversion detector circuit which receives the basic clock $f_M$ (fed to CK input) and HSWP (A/B) as inputs and produces an output that is supplied to the S input of an initial flag latch 11. The initial flag latch 11 receives at its R input a CY output from an initial counter 12, and the Q output of the latch 11 is supplied to the R input of the initial counter 12.

The initial counter 12 is under control of the system controller 3 and receives the Q output of the initial flag latch 11 and the basis clock $f_M$ at its R and CK inputs, respectively, and the CY output of the initial counter 12 is supplied both to the R input of the initial flag latch 11 and to the S input of a head touch window flag latch 14 via an AND gate 13 whose operation is controlled by the system controller 3. The CY output of the initial counter 12 is also fed to an input of an encoding data processing unit 18 to be described below.

The head touch window flag latch 14 generates a window for prohibiting the detection of head touch as long as noise is produced when head switching is effected. The Q output of the latch 14 is fed as an On signal into a decoding data processing unit 17 and the R input of the latch 14 is fed with a clear signal from the unit 17.

The numeral 15 denotes a reproducing amplifier that amplifies the signals from rotary heads 1A and 1B which send the amplified signals to the decoding data processing unit 17 to be described below. The numeral 16 signifies a recording amplifier which, in response to the HSWP (A/B) signal, receives data to be recorded data from the encoding data processing unit 18 (to be described below) and supplies it to the rotary heads 1A and 1B via switch SW1.

The decoding data processing unit 17 extracts data from the RF signal from the reproducing amplifier 15 and sends it to a D/A converter unit after performing the necessary operations such as 10/8 conversion (demodulation), de-interleaving, and error correction. At the same time, the unit 17 performs other operations, such as head touch detection, ATF sync detection and tracking error detection, on the extracted data and supplies error signals to the capstan servo 8 from a tracking deviation signal generator section 17a.

The encoding data processing unit 18 performs the necessary operations on A/D converted data such as interleaving, parity addition, 8/10 conversion and ATF signal addition, and supplies the so processed data to the recording amplifier 16.

The system having the above-described configuration performs a recording operation when the PB/REC signal from the system controller 3 is at a low (L) level. When the PB/REC signal is "L", switch 4 is placed on the side of contact b and the capstan servo 8 is supplied with the reference signal Y Hz from the reference signal generator 5, whereupon capstan servo as referenced to the signal Y Hz is actuated to perform tracking control.

As the drum 1 rotates, PGA and PGB generate pulses and in response to these pulses, the HSWP (A/B) generator 9 produces an HSWP (A/B) output signal which assumes a "H" level when A head 1A is scanning and a "L" level when B head 1B is scanning. The HSWP (A/B) signal is fed into the phase inversion detector circuit 10 and when the level of this signal changes, or when the circuit 10 has detected a head change, its output is maintained at a "H" level for one basic clock pulse period.

When the output of the phase inversion detector circuit 10 has risen from a "L" to "H" level, the initial flag latch 11 is set and its Q output becomes high, whereupon the initial counter 12 starts a counting operation. In the embodiment under discussion, the counter 12 counts the number of basic clocks $f_M$ corresponding to a given period equivalent to 3.75 ms, when the CY output of the counter rises to reset the initial flag latch 11 while at the same time, the high CY output is applied to the encoding data processing unit 18 as a recording start signal. In response to this recording start signal, the encoding data processing unit 18 produces data to be recorded having a predetermined format.

When the PB/REC signal from the system controller 3 is at a high (H) level, the switch 4 is placed on the side of contact a and the rotary heads 1A and 1B are connected to the reproducing amplifier 15 while the RF signal is fed to the decoding data processing unit 17.

The operation of the capstan servo 8 is referenced to the amount of tracking deviation supplied from the decoding data processing unit 17. The amount of tracking deviation is an ATF error signal that is associated with the difference between the levels of amplitude of crosstalk of pilot signals from the two tracks adjacent to the track being scanned. The details of this signal will be given later in this specification.

The HSWP (A/B) signal generator 9 and the phase inversion detector circuit 10 will operate in a playback mode in the same manner as in a recording mode. The initial counter 12 operates in a manner specific to the playback mode, in which the level of the CY output of the counter 12 becomes high when the counts become equivalent to a certain value, say, 100 µs/1 ms. This is in order to ensure that the head touch operation to be described later in this specification will be prohibited as long as noise is produced when a head change is effected and that after the lapse of the given period specified above, the high CY output is sent through the AND gate 13 to the head touch window flag latch 14, which then is set to bring its Q output to a high level and to produce an ON signal for head touch detection. In response to the ON signal from the latch 14, the decoding data processing unit 17 detects the occurrence of a head touch, or the generation of an RF signal upon contact between tape T and head 1A or 1B, and as a result of this detection, the head touch window flag latch 14 is cleared and the ON signal returns to a low level.

The details of the portion of the decoding data processing unit 17 which is specifically related to tracking control are hereinafter described with reference to a block diagram shown in FIG. 2.

Figure 2:
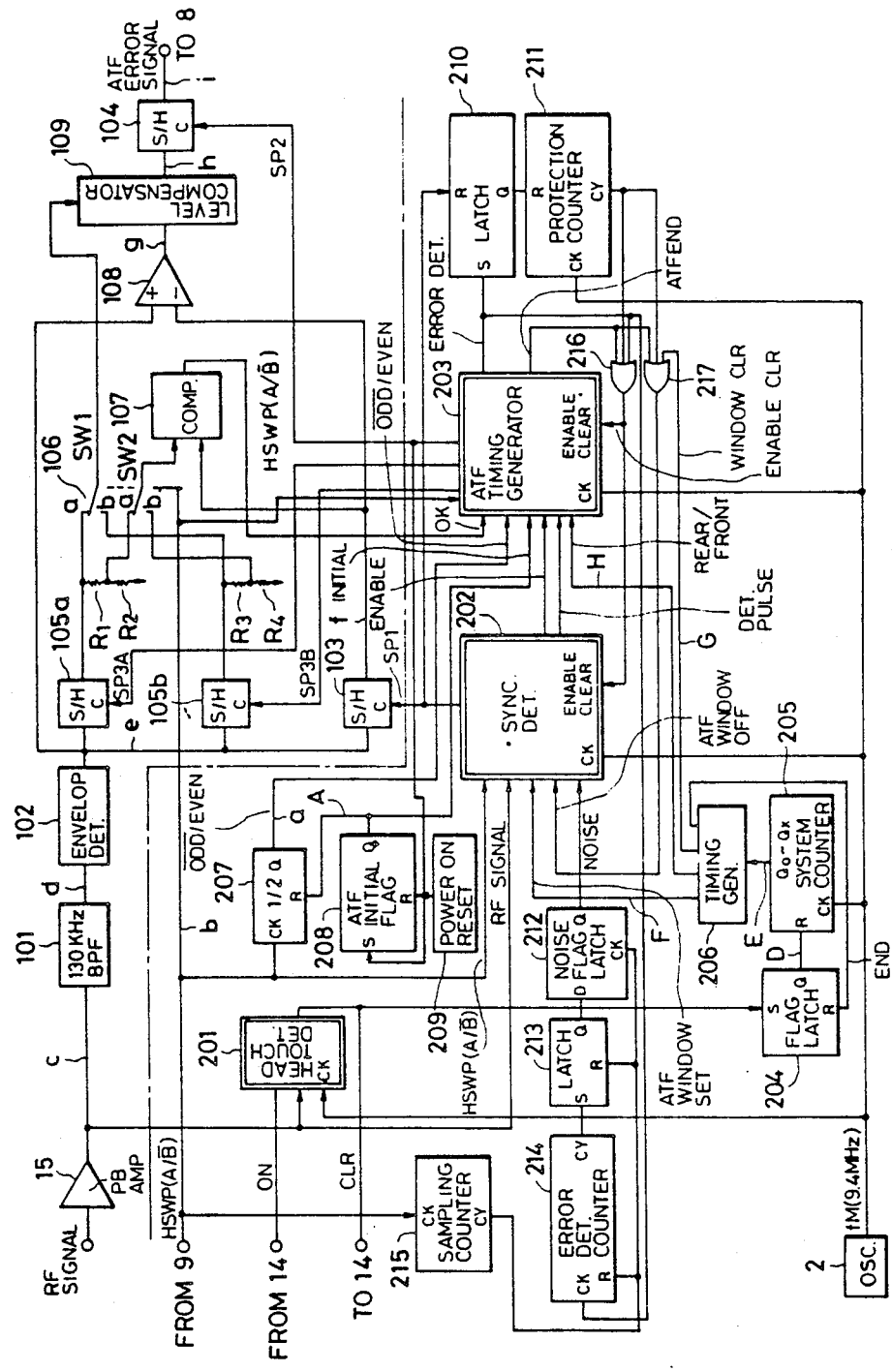
FIG. 2 is a block diagram showing the essential part of the apparatus of the present invention.

The circuit shown in FIG. 2 is roughly divided into two portions, an analog portion that is shown above the one-short-and-one-long dashed line and a digital portion shown below that line. The analog portion is composed of the reproducing amplifier 15, a bandpass filter (BPF) 101, an envelope detector 102, a first sample-and-hold (S/H) circuit 103, a second S/H circuit 104, a third S/H circuit 105a and 105b, a toggle switch unit 106, a comparator 107, a differential amplifier 108, a level compensator circuit 109, and resistors $R_1$ to $R_4$.

The digital portion is composed of the crystal oscillator 2, a head touch detector circuit 201, a sync detector circuit 202, an ATF timing generator 203, a reproduction flag latch 204, a system counter 205, a timing generator 206, a half-frequency divider 207, an ATF initial flag latch 208, a power-on reset circuit 209, a latch circuit 210, a protective counter 211, noise flag latch 212, a latch 213, and error detection counter 214, a sampling counter 215, and OR gates 216 and 217.

The analog portion is first described. The reproducing amplifier 15 receives at its input an RF signal from the rotary heads 1A and 1B (FIG. 1) and the output of the amplifier is supplied to the BPF 101, head touch detector circuit 201, and the sync detector circuit 202.

The BPF 101 transmits only the 130 kHz component of the RF signal and supplies it to the envelope detector 102, which performs envelope detection on the 130 kHz component and applies its output to the input of each of the S/H circuits 103, 105a and 105b and to the (+) input of the differential amplifier 108.

The S/H circuit 103 samples and holds the output of the envelope detector 102 in response to a sampling signal SP 1 that is applied to its C input from the sync detector circuit 202, and said output is thereafter applied to one of the two inputs of the comparator 107 and to the (−) input of the differential amplifier 108. What is sampled and held by the S/H circuit 103 is the DC level of crosstalk of the pilot signal from one of the two tracks adjacent to the track being scanned.

The S/H circuit 104 receives at its input a signal that has been level-adjusted by the level adjusting circuit 109. This signal is sampled and held by the circuit 104 in response to a sampling signal SP 2 from the ATF timing generator 203, and thereafter supplied to the capstan servo 8 (FIG. 1) as an ATF error signal which indicates the difference between the DC levels of crosstalk from the two adjacent tracks.

The S/H circuit 105a samples and holds the output of the envelope detector 102 in response to a sampling signal SP 3A from the ATF timing generator 203, and the output of the circuit 105a is supplied to one end of the resistor $R_1$ and to contact a of switch SW 1 in the toggle switch unit 106. What is sampled and held by the S/H circuit 105a is the DC level of the pilot signal on the on-track (in this case, track A) being reproduced.

The S/H circuit 105b samples and holds the output of the envelope detector 102 in response to a sampling signal SP 3B from the ATF timing generator 203, and the output of the circuit 105b is supplied to one end of the resistor $R_3$ and to contact b of switch SW1 in the toggle switch unit 106. What is sampled and held by the S/H circuit 105b is the DC level of the pilot signal on the on-track (in this case, track B) being reproduced.

Resistors $R_1$ to $R_4$ are of the same value; resistors $R_1$ and $R_2$ serve to divide the output of the S/H curcuit 105a applied to one end of $R_1$, and resistors $R_3$ and $R_4$ serve to divide the output of the S/H circuit 105b applied to one end of $R_3$. The junction between resistors $R_1$ and $R_2$ is connected to contact a of switch SW2 in the toggle switch unit 106, and the junction between resistors $R_3$ and $R_4$ is connected to contact b of the same switch SW2. The output level obtained at each of the junctions is half of the value that is sampled and held by the S/H circuits 105a and 105b.

The toggle switch unit 106 is controlled by the HSWP (A/B) signal in such a manner that it is placed on the side of contact b when the signal is low.

At one input of the comparator 107 is fed half the level of the output of S/H circuit 105a or 105b by way of resistors $R_1/R_2$ or $R_3/R_4$ and switch SW2, and the other input of comparator 107 is fed with the output of S/H circuit 103. The level of the output of the comparator 107 becomes high when half of the value sampled and held by S/H circuit 105a or 105b is higher than the output level of S/H circuit 103, and the comparator 107 supplies this high output to an input of the ATF timing generator 203 as an OK signal.

The differential amplifier 108 determines the difference between the output of the envelope detector 102 at the (+) input and the output of the S/H circuit 103 at the (−) input and feeds the difference to the level adjusting circuit 109. In other words, when the envelope detector 102 produces as its output the DC level of crosstalk from the other adjacent track, the amplifier 108 produces as its output the amount of tracking deviation, or the difference between the levels of crosstalk from the two adjacent tracks.

Based on the output level for S/H circuit 105a or 105b, or the output level of the pilot signal on the on-track, the level adjusting circuit 109 adjusts the signal level from the differential amplifier, or the difference between the levels of crosstalk of pilot signals from the two adjacent tracks, so as to compensate for the variation in the output levels of the two rotary heads 1A and 1B. The level adjusting circuit 109 may be in the form of an analog divider circuit that performs a division with the difference between the levels of crosstalk of pilot signals from the two adjacent tracks serving as a numerator, and the output level of the pilot signal on the on-track serving as a denominator. Alternatively, the level adjusting circuit 109 may be a gain variable amplifier circuit having the configuration shown in FIG. 3.

Figure 3:
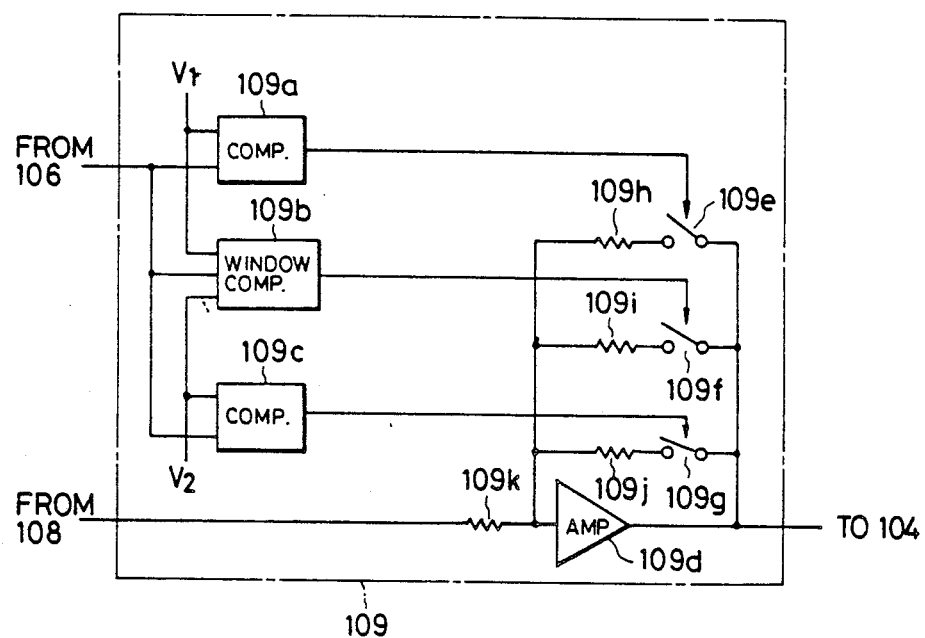
FIG. 3 is a circuit diagram showing a specific configuration of part of the system shown in FIG. 2.

As shown in FIG. 3, a comparator 109a receives at one of its two inputs the level of the pilot signal on the on-track that has been sampled and held by S/H circuit 105a or 105b, and the other input is fed with a reference voltage $V_1$ as a threshold level. If the pilot signal has a higher level than $V_1$, the output of the comparator 109a becomes high. A window comparator 109b has three inputs, the first input being fed with the level of the pilot signal and the second and third inputs with reference voltages $V_1$ and $V_2$, respectively. When the level of the pilot signal is between the two threshold values provided by reference voltages $V_1$ and $V_2$, the output of the window comparator 109b becomes high. A comparator 109c receives the level of the pilot signal at one of its two inputs, and reference voltage $V_2$ is fed to the other input as a threshold value. When the level of the pilot signal is lower than the reference voltage $V_2$, the output of the comparator 109c becomes high.

An amplifier 109d has resistors 109h to 109j connected between its input and output via switches 109e to 109g that will respectively turn on when comparators 109a to 109c produce high (H) outputs. The input of the amplifier 109d is connected to the output of the differential amplifier 108 via a resistor 109k, and its output is connected to the input of S/H circuit 104.

Resistors 109h to 109j determine the gain of amplifier 109d in such a manner that it has the smallest gain when it is connected to resistor 109h and that it has progressively higher gains as it is connected to resistors 109i and 109j. Therefore, as the level of pilot signal from the S/H circuit 105a or 105b increases, the gain of the amplifier 109d decreases, so that the level adjusting circuit 109 will produce a smaller difference between the levels of crosstalk of pilot signals from the two adjacent tracks than in other cases. If the level of the pilot signal on the on-track is small, the output difference between the levels of crosstalk of pilot signals from the two adjacent tracks will become larger than in other cases. This is the mechanism by which the variation in the difference between the levels of crosstalk from the two adjacent tracks that occurs as a result of variations in such factors as the characteristics of rotary heads 1A and 1B can be absorbed and compensated automatically.

Although not shown, the level adjusting circuit 109 may be configured as a divider circuit. In this case, if the level of the pilot signal on the track being scanned by rotary head 1A is 10 V and if the difference between the levels of crosstalk from the two adjacent tracks is 4 V, the result of division is 4/10=0.4. If, on the other hand, the level of the pilot signal on the track being scanned by rotary head 1B is 8 V while the difference between the levels of crosstalk from the two adjacent tracks is 3.2 V, the result of division is 3.2/8=0.4. This means that even if there is a difference between the output levels of the two rotary heads A and B, ATF error signals of the same value will be produced as output and the variation in the difference between the levels of crosstalk from the two adjacent tracks can be properly compensated.

The digital portion of the circuit shown in FIG. 2 is described hereinafter. Upon receiving an ON signal from the head touch window flag latch 14 (FIG. 1) and the basic clock $f_M$, the head touch detector circuit 201 detects the reception of an ATF signal and supplies a signal to the S input of the reproduction flag latch 204. The details of this operation will be shown later in this specification.

The sync detector circuit 202 receives at its inputs the RF signal, the HSWP (A/B) signal, an ATF window set signal from the timing generator 206, an ATF window off signal from the OR gate 217, a noisy signal from the noisy flag latch 212, the basic clock $f_M$ from the crystal oscillator 2, and an enable clear signal from the OR gate 216, and produces a sampling signal SP1, an enable signal and a detection pulse signals its outputs, the sampling signal SP1 is sent to the C input of the S/H circuit 103 and to the R input of the latch 210. Each of the enable signal and the detection pulse signal is sent to the ATF timing generator circuit 203. After converting the RF signal to a digital signal, the sync detector circuit 202 detects the beginning of the sync pattern SY1 of rotary head 1A and that of the sync pattern SY2 of rotary head 1B so as to produce a sampling signal SP1 as an output, and thereafter outputs detection pulse signals in response to sequentially detected sync signals. The details of the operation of the sync detector circuit 202 will also be given later in this specification.

The ATF timing generator 203 receives at its inputs the OK signal from the comparator 107, an ODD-/EVEN signal coming from the Q output of the half-frequency divider 207, an initial signal coming from the Q output of the ATF initial flag latch 208, an enable signal and a detection pulse signal from the sync detector circuit 202, a rear/front signal from the timing generator 206, an enable clear signal from the OR gate 216, and the basic clock $f_M$ from the crystal oscillator 2, and produces sampling signals SP2, SP3A and SP3B, an error detection signal, and an ATF END signal at its outputs. The sampling signal SP2 is fed to the C input of the S/H circuit 104 and to the S input of the ATF initial flag latch 208; sampling signal SP3A is fed to the C input of the S/H circuit 105a; sampling signal SP3B is fed to the C input of the S/H circuit 105b; the error detection signal is fed to the S input of latch 210, to one input of the OR gate 216, and to the CK input of the error detection counter 214; and ATF END signal is fed to one input of each of the OR gates 216 and 217.

The ATF timing generator 203 receives an enable signal from the sync detector circuit 202 and when the level of said signal is high, a timer counter (not shown) for timing generation becomes operational. At the same time, the generator 203 receives a detection pulse signal from the sync detector circuit 202 and when the number of detection pulses counted within a specified time exceeds a specified value, the generator 203 outputs sampling signals SP2, SP3A and SP3B, the generator 203 outputs an error detection signal when the detection pulse counts are below the specified value or if the OK signal coming from the comparator 107 is at a low (L)

level. The details of the operation of the ATF timing generator 203 will also be described later in this specification.

For producing the basic clock $f_M$, the crystal oscillator 2 oscillates at 9.4 MHz which is the rate of transmission of channel bit data by R-DAT. The basic clock $f_M$ produced by the oscillator 2 is applied to the CK input of each of the head touch detector circuit 201, sync detector circuit 202, ATF timing generator 203, system counter 205, and the protective counter 211.

Each of the latches 204, 208, 210 and 213 is composed of an R-S flip-flop whose Q output becomes high in response to the rising edge of its S input and becomes low in response to the rising edge of its R input.

The reproduction flag latch 204 receives the output of the head touch detector circuit 201 and an END signal from the timing generator 206 at the S and R inputs, respectively, and the Q output of the latch 204 is supplied to the R input of the system counter 205. The system is in a relay mode when the Q output of the latch 204 is at a high level.

The system counter 205 receives the Q output of the reproduction flag latch 204 and the basic clock $f_M$ at the R and CK inputs, respectively, and the outputs $Q_0$-$Q_x$ of the counter 205 are fed into the timing generator 206, the function of the system counter 205 is to indicate the approximate positions at which various signals are recorded on the tracks.

In response to the Q1-QX outputs from the system counter, the timing generator 206 generates an ATF window set signal, a rear/front signal, a window clear signal and an END signal at its outputs. The ATF window set signal is supplied to the sync detector circuit 202, the rear/front signal to the ATF timing generator 203, the window clear signal to the OR gate 217, and the END signal to the R input of the reproduction flag latch 204. The timing generator 206 decodes the outputs of the system counter 205 and generates the necessary timing signals for various parts off the system.

The half-frequency divider 207 receives an HSWP (A/B) signal at the CK input and halves its frequency to produce an ODD/EVEN signal at the Q output, which is supplied to the ATF timing generator 203. The R input of the half-frequency divider 207 is fed with the Q output of the ATF initial flag latch 208.

The ATF initial flag latch 208 receives a sampling signal SP2 from the ATF timing generator 203 at the S input and a signal from the power-on reset circuit 209 at the R input. The Q output of the latch 208 is fed to the R input of the half-frequency divider 207 and to the ATF timing generator 203. The ATF initial flag latch 208 generates a flag indicating the application of capstan servo by ATF.

The power-on reset circuit 209 produces a high (H) output when power is on.

The latch 210 receives an error detection signal from the ATF timing generator 203 at its S input, and a sampling signal SP1 form the sync detector circuit 202 at its R input. The Q output of the latch 210 is fed to the R input of the protective counter 211. The Q output of the latch 210 becomes high when it detects an error and is reset in response to the reception of a sampling signal SP1.

The protective counter 211 performs counting for a given period after error detection; only when its R input is at a high level does the counter 211 counts the number of basic clocks $f_M$ applied to the CK input, and the counter is cleared when the level of the R input becomes low. The R input of the counter 211 is fed with the Q output of the latch 210, and its CY output is fed to an input of the OR gate 217.

The noisy flag latch 212 serves to store temporarily the result of checking as to whether the system is noisy in a replay mode. The latch 212 is composed of a D flip-flop, in which the D input is fed with the Q output of the latch 213 and the CK input with the CY output of the sampling counter 215, with the Q output being supplied as a noisy signal to the sync detector circuit 202.

The latch 213 receives the CY output of the error detection counter 214 at its S input, and the CY output of the sampling counter 215 at its R input, with the Q output being supplied to the D input of the noisy flag latch 212.

The error detection counter 214 receives the error detection signal from the ATF timing generator 203 at its CK input, and the CY output of the sampling counter 215 at its R input, with the CY output being supplied to the S input of the latch 213. The counter 214 counts the number of times the sampling signal SP1 was detected erroneously in a given period, and when the counts exceed a predetermined value, the CY output of the counter 214 becomes high.

The sampling counter 215 receives an HSWP (A/B) signal at its CK input, and its CY output is supplied to each of the R input of the error detection counter 214, the R input of the latch 213, and the CK input of the noisy flag latch 212.

The OR gate 216 is fed with the error detection signal and ATF END signal from the ATF timing generator 203, as well as the CY output of the protective counter 211. The gate produces at its output an enable clear signal which is sent to both the sync detector circuit 202 and the ATF timing generator 203.

The OR gate 217 receives at its three inputs a window clear signal form the timing generator 206, an ATF END signal from the ATF timing generator 203, and the CY output form the protective counter 211, and produces at its output an ATF window off signal which is sent to the sync detector circuit 202.

In the system having the configuration described above, a generated RF signal is supplied past the reproduction amplifier 15 to the head touch detector circuit 201 and sync detector circuit 202, as well as to the BPF 101 which transmits only the 130 kHz component of the RF signal. The amplitude level of the 130 kHz component is converted to a DC level in the envelope detector 102 and thereafter applied to the input of each of the S/H circuits 103, 104, 105a and 105b and to the (+) input of the differential amplifier 108.

The envelope detector 102 outputs in order on a time basis the DC level of the amplitude of the crosstalk of a pilot signal from one adjacent track and that of the crosstalk of a pilot signal from the other adjacent track. The detector 102 also outputs the DC level of the amplitude of the pilot signal on the on-track either before or after the pilot signals on the two adjacent tracks.

The S/H circuit 103 samples and holds the DC level of the pilot signal on one adjacent track at the timing determined by the sampling signal SP1 from the sync detector circuit 202. The sample-and-hold level of crosstalk from the one adjacent track is applied to the comparator 107 and one input of the differential amplifier 108.

The S/H circuit 105a samples and holds the DC level of the pilot signal on the on-track when track A with (+) azimuth is being reproduced, and S/H circuit 105b samples and holds the DC level of the pilot signal on the on-track when track B with (−) azimuth is being reproduced. The output of the S/H circuit 105a, or the DC level of the pilot signal on the on-track, is supplied to the control input of the level adjusting circuit 109 via contact a of switch SW1 in the toggle switch unit 106. At the same time, the output of the S/H circuit 105a is halved by voltage division with resistors $R_1$ and $R_2$ and supplied to one input of the comparator 107 via contact a of switch SW2. In the same manner, the output of the S/H circuit 105b is supplied to the level adjusting circuit 109 via contact b of switch SW1 while it is halved by voltage division with resistors R3 and R4 and supplied to said one input of the comparator 107 via contact b of switch SW2.

When the level of the input that is supplied to the comparator 107 via switch SW2 is higher than the output from the S/H circuit 103, the comparator 107 produces a high (H) OK signal, indicating that the level of crosstalk from one adjacent track has been sampled correctly. The opposite case indicates that the level of the on-track has been sampled. Therefore, a low (L) OK signal produced by the comparator 107 indicates erroneous detection of the sync signal. The OK signal produced from the comparator 107 is supplied to the ATF timing generator 203.

When the envelope detector 102 outputs the DC level of the amplitude of crosstalk from the other adjacent track, the differential amplifier 108 receives at the (−) input the DC level of the amplitude of crosstalk from one adjacent track, thereby producing at its output the difference between the DC levels of crosstalk from the two adjacent tracks. This difference provides the amount of tracking deviation, which is fed to the input of the level adjusting circuit 109.

The output of the S/H circuit 105a or 105b is applied to the level adjusting circuit 109 as a control input and if this control input is large (or small), the circuit 109 reduces (or increases) the input signal before it is sent as an output. In short, the level adjusting circuit 109 automatically compensates for the variation in the outputs of the two rotary heads and feeds the compensated output to the S/H circuit 104 in the next stage. The S/H circuit 104 samples and holds the corrected amount of deviation for the two adjacent tracks at the timing determined by sampling signal SP2. The output of the S/H circuit 104 is supplied to the capstan servo 8.

Figure 4:
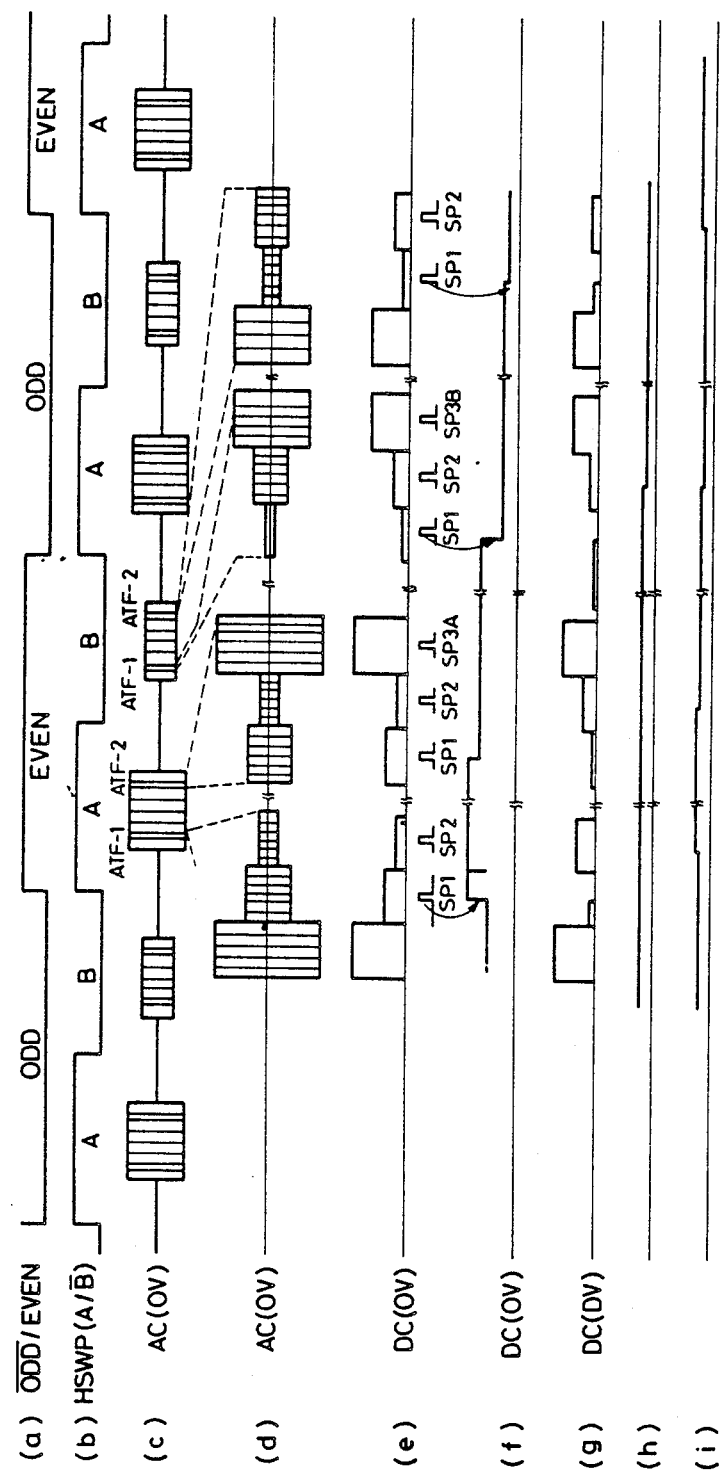
FIGS. 4 and 5 are timing charts showing the waveforms of signals generated in various parts of the system shown in FIG. 2.

FIG. 4 is a timing chart that shows the waveforms for the signals generated in various parts of the system as a result of the operations described above, with the individual waveforms being keyed to the symbols attached to the respective parts.

The level of the HSWP (A/B) signal whose waveform is depicted in FIG. 4(b) becomes high (H) when reproduction is achieved by A head 1A with (+) azimuth, and becomes low (L) when reproduction is made with B head 1B having (−) azimuth. When there is a head change, the phase of the HSWP (A/B) signal is inverted. Upon phase inversion, the level of the Q output of the initial flag latch 11 (FIG. 1) becomes high and the initial counter 12 (FIG. 1) is actuated. The level of the CY output of the initial counter 12 becomes high at the time when it is found that the tape has passed a noisy portion, and as a result, the initial counter 12 sets the head touch window flag latch 14 (FIG. 1) and brings its Q output to a high level. When the level of the Q output of the latch 14 becomes high, the head touch detector circuit 201 is actuated.

When detecting the reproduction of RF signal due to contact between tape and head, the head touch detector circuit 201 produces a high (H) output, which sets the reproduction flag latch 204 and brings its Q output to a high level. When the level of the Q output of the latch 204 becomes high, the system counter 205 starts a counting operation. With this point of time being used as a reference, the system counter 205 allows estimation of the approximate positions at which the individual signals are recorded on the tape. In a response to $Q_0$–$Q_x$ outputs from the system counter 205, the timing generator 206 supplies the sync detector circuit 202 with an ATF window set signal a little before the positions at which ATF-1 and ATF-2 are recorded.

After converting the RF signal into a digital signal, the sync detector circuit 202 detects sync signal 1 ($=f_2$) generated when reproduction is achieved by A head 1A and sync signal 2 ($=f_3$) generated when reproduction is made with B head 1B. Detection of these sync signals by circuit 202 is based on the following relationship between frames and the patterns of the sync signals:

| Frame | $f_2$ (A) | $f_3$ (B) |
|---|---|---|
| ODD (1 block) | 20 waves/40 signals | 30 waves/60 signals |
| EVEN (0.5 block) | 10 waves/20 signals | 15 waves/30 signals |

When detecting four consecutive sync signals in a normal mode or five consecutive sync signals in a noisy mode, the sync detector circuit 202 outputs a sampling signal SP1 to the S/H circuit 103 so that it will sample and hold the level of crosstalk of the pilot signal $f_1$ from one adjacent track. At the same time, the sync detector circuit 202 supplies an enable signal to the ATF timing generator 203. Upon each detection of consecutive sync signals, the sync detector 202 supplies a pulse detection signal to the ATF timing generator 203.

In response to a high (H) enable signal from the sync detector circuit 202, the sync detection counter and timer in the ATF timing generator 203 will be actuated. At a time 0.25 blocks after the outputting of the sampling signal SP1 from the sync detector circuit 202, the ATF timing generator 203 checks to see if the crosstalk from adjacent tracks has been correctly sampled and held at the timing determined by said sampling signal. Then, after 1.25 blocks, the timing generator 203 checks to see if the number of sync signals detected exceeds a specified value. If the result is affirmative, it is concluded that detection of sync signals has been effected correctly and after 2 blocks, the generator 203 supplies a sampling signal SP2 to the S/H circuit 104, which samples and holds the difference between the levels of crosstalk from the two adjacent tracks and supplies its output to the capstan servo 8 as the amount of tracking deviation.

If the pilot signal $f_1$ on the on-track is present behind the sync signal, the relevant ATF region is ATF-2 when reproduction is being effected by head 1A and ATF-1 when head 1B is in action. In the former case, the ATF timing generator 203 outputs a sampling signal SP3A in the latter case, a sampling signal SP3B is provided, both events occurring after 4 blocks, the sampling signal SP3A is supplied to the S/H circuit 105a, and the sampling signal SP3B to the S/H circuit 105b, so that each S/H circuit will sample and hold the level of the pilot signal on the on-track being reproduced with the relevant head.

If the above sequence of operations has been performed correctly, the ATF timing generator 203 outputs an ATF END signal which is supplied as an enable clear signal to the sync detector circuit 202 and back to the ATF timing generator 203 via the OR gate 216. The ATF END signal is also passed through the OR gate 217 to be supplied to the sync detector circuit 202 as a window off signal, in response to which the window for sync detection by the circuit 202 disappears so as to stop the operation of detecting the pattern of sync signals.

In the case of erroneous sampling, that is, if it is found that the level of the pilot signal on the on-track has been sampled-and-held by the S/H circuit 103, with the level of the output from the comparator 107 being low, or if the number of sync signals detected is below a specified value, both the error detection signal and the Q output of the latch 210 are brought to a high level so that the protective counter 211 performs counting operation while the error detection counter 214 counts down by "1". When the level of the error detection signal becomes high, the enable clear signal which is sent through the OR gate 216 to the sync detector circuit 202 and the ATF timing generator 203 is again brought to a high level. When the level of the enable clear signal becomes high, the sync detector circuit 203 repeats the operation of sync detection from the beginning and if a predetermined number of sync signals have been detected, the circuit 203 outputs another sampling signal SP1. At the same time, the ATF timing generator 203 sets the sync detection counter and timer in the initial state. If the sync detector circuit 202 outputs another sampling signal SP1 as mentioned above, the latch 210 is reset and its Q output becomes low so that the protective counter 211 is set in the initial state.

When a specified time (2.5 block periods) has passed after the outputting of one error detection signal (i.e., when the level of the CY output of the protective counter 211 has become high), the enable clear signal that is sent through the OR gate 216 to the sync detector circuit 202 and the ATF timing generator 203 is brought to a high level so as to stop the operation of these components.

The sampling counter 215 counts down by "1" in response to the rising edge of the HSWP (A/B) signal. This is in order to control the tape over a certain length in such a way that if error detection effected in that period exceeds a specified value, the level of the CY output of the error detection counter 214 becomes high, whereupon the Q output of the noisy flag latch 213 is brought to a high level so as to inform the sync detection circuit 202 that the tape is noisy.

In response to a window clear signal coming from the timing generator 206, the level of the ATF window off signal supplied to the sync detector circuit 202 through the OR gate 217 becomes high and this provision is made to deal with large dropouts.

Figure 5:
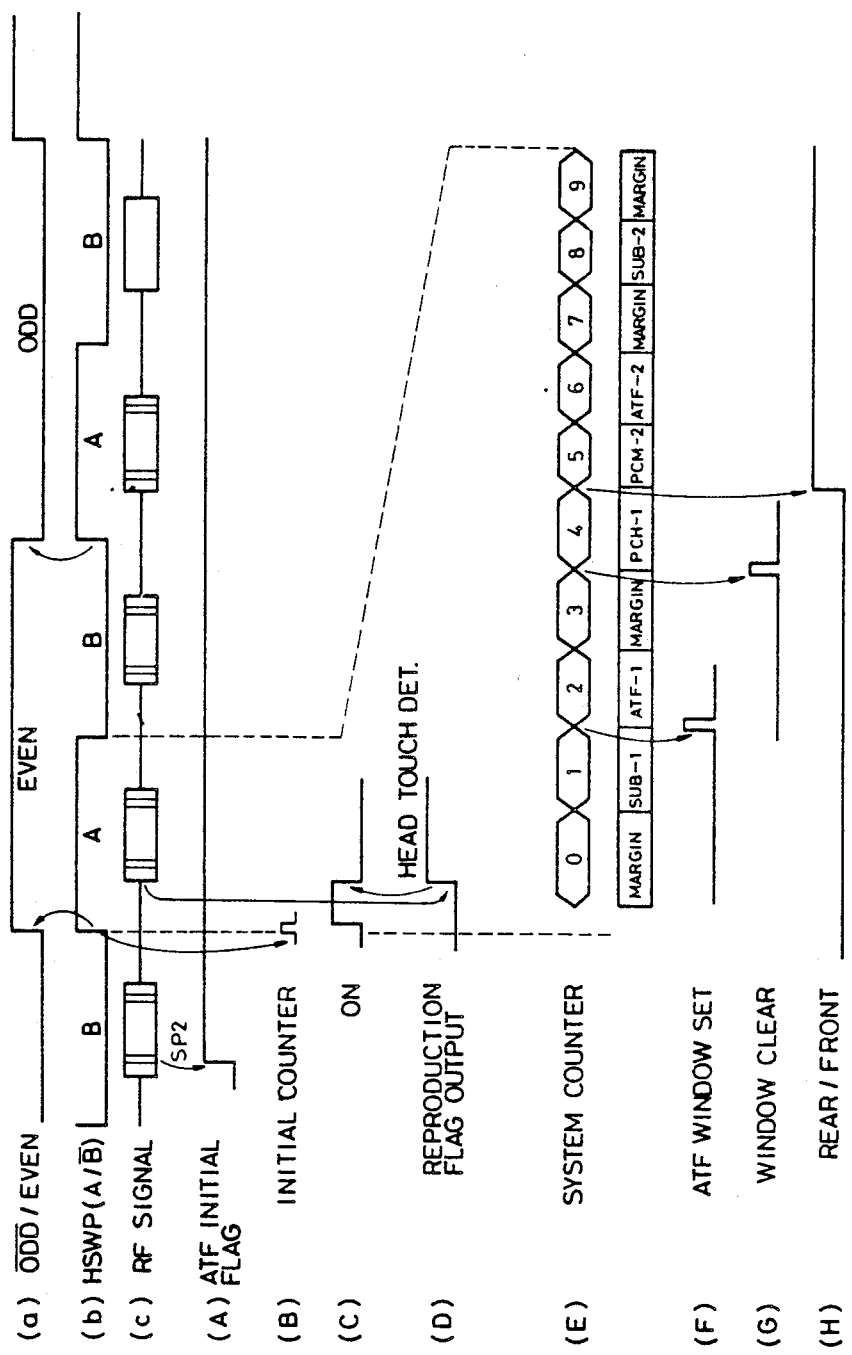

FIG. 5 is a timing chart that shows the approximate waveforms of the signals generated in various parts of the digital portion of the system after the initial flag latch 11 is set in a playback mode, with the individual waveforms being keyed to the symbols used in FIGS. 1 and 2.

Figure 6:
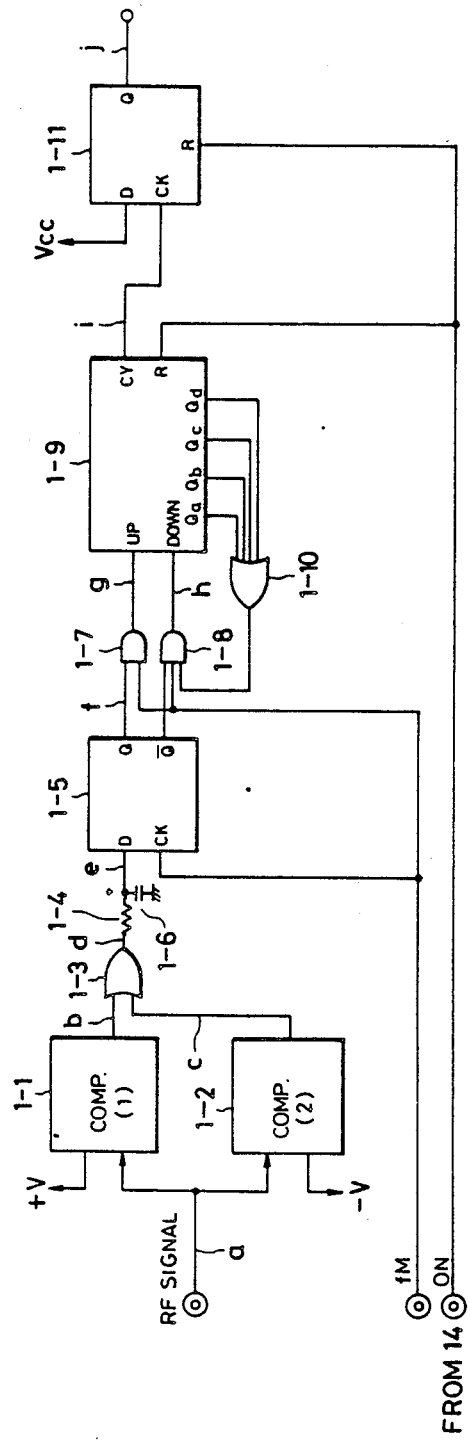
FIG. 6 is a circuit diagram showing a specific configuration of part of the system shown in FIG. 2.

FIG. 6 is a block diagram showing a specific configuration of the head touch detector circuit 201 described on the foregoing pages.

In FIG. 6, a comparator 1—1 receives an RF signal at one input, and a reference voltage $+V$ at the other input, and a comparator 1-2 receives the RF signal at one input, and a reference voltage $-V$ at the other input. The outputs of the two comparators are connected to the D input of a D flip-flop (FF) 1-5 through an OR gate 1-3 and a resistor 1-4, and to the ground through a capacitor 1-6.

The D FF 1-5 receives basic clock $f_M$ at the CK input, and its Q and $\overline{Q}$ outputs are connected to one input of an AND gate 1-7 and one input of an AND gate 1-8, respectively.

A basic clock $f_M$ is fed to the other input of the AND gate 1-7 and to a second input of AND gate 1-8. The output of AND gate 1-7 is connected to the UP input of an up-down counter 1-9, and the output of AND gate 1-8 is connected to the DOWN input of the counter 1-9. The $Q_A$-$Q_D$ outputs of the up-down counter 1-9 are connected to a third input of the AND gate 1-8 through an OR gate 1-10, and the CY output of the counter 1-9 is connected to the CK input of a D FF 1-11. The D input of the D FF 1-11 is connected to Vcc and its Q output provides the output of the touch detector circuit 201.

The R input of each of the up-down counter 1-9 and the D FF 1-11 is fed with the $\overline{Q}$ output of the head touch window flag latch 14 (FIG. 1).

In the configuration described above, comparator 1—1 produces a high (H) output if the level of the RF signal is higher than $+V$, and produces a low (L) output in the opposite case. Comparator 1-2 produces a high output if the level of the RF signal is lower than $-V$, and produces a low output in the opposite case. Therefore, if the level of the RF signal is not within the range of $\pm V$, the OR gate 1-3 will produce a high output.

The resistor 1-4 and capacitor 1-6 combine together to form an integrator circuit for absorbing any noise such as a spike that is present in the output of the OR gate 1-3. The output of OR gate 1-3 from which any spike noise has been rejected by the integrator circuit is applied to the D input of the D FF 1-5.

The D FF 1-5 samples the state of its D input at the timing determined by the basic clock $f_M$ applied to the CK input, and produces the samples state at its Q output. The $\overline{Q}$ output of D FF 1-5 is an inverted version of the Q output. The Q output of the D FF 1-5 is applied to one input of the AND gate 1-7 which is fed with the basic clock $f_M$ at the other input. When the Q output of the D FF 1-5 is high, the basic clock $f_M$ is fed with to the UP input of the up-down counter 1-9 via AND gate 1-7. Therefore, the up-down counter 1-9 counts up the basic clock $f_M$ if the Q output of the head touch window flag latch 14 is high (i.e., the window is on) and if the Q output of the D FF 1-5 is high.

If the Q output of the D FF 1-5 is low, that is, if the level of the RF signal is within the range of $\pm V$ indicating that no signal to be reproduced is present, the $\overline{Q}$ output of the D FF 1-5 becomes high. In this state, if any one of the $Q_A$-$Q_D$ outputs of the up-down counter 1-9 is high (i.e., the contents of the counter are not zero), the basic clock $f_M$ is applied to the DOWN input of the counter through the AND gate 1-8 so that the counter will count down. If, as a result of this countdown or resetting, the contents of the counter become zero, with all of the $Q_A$-$Q_D$ outputs being at a low level, the OR gate 1-10 will produce a low output and the AND gate 1-8 is closed so that the basic clock $f_M$ will not be supplied to the DOWN input of the counter 1-9.

If, as a result of countup by the up-down counter 1-9, a carry is produced, the CY output of the counter becomes high. In response to the rising edge of the high CY output, the D FF 1-11 stores the state of its D input. Since the D input is at a high level D FF 1-11 will produce a Q output of high level.

Figure 7:
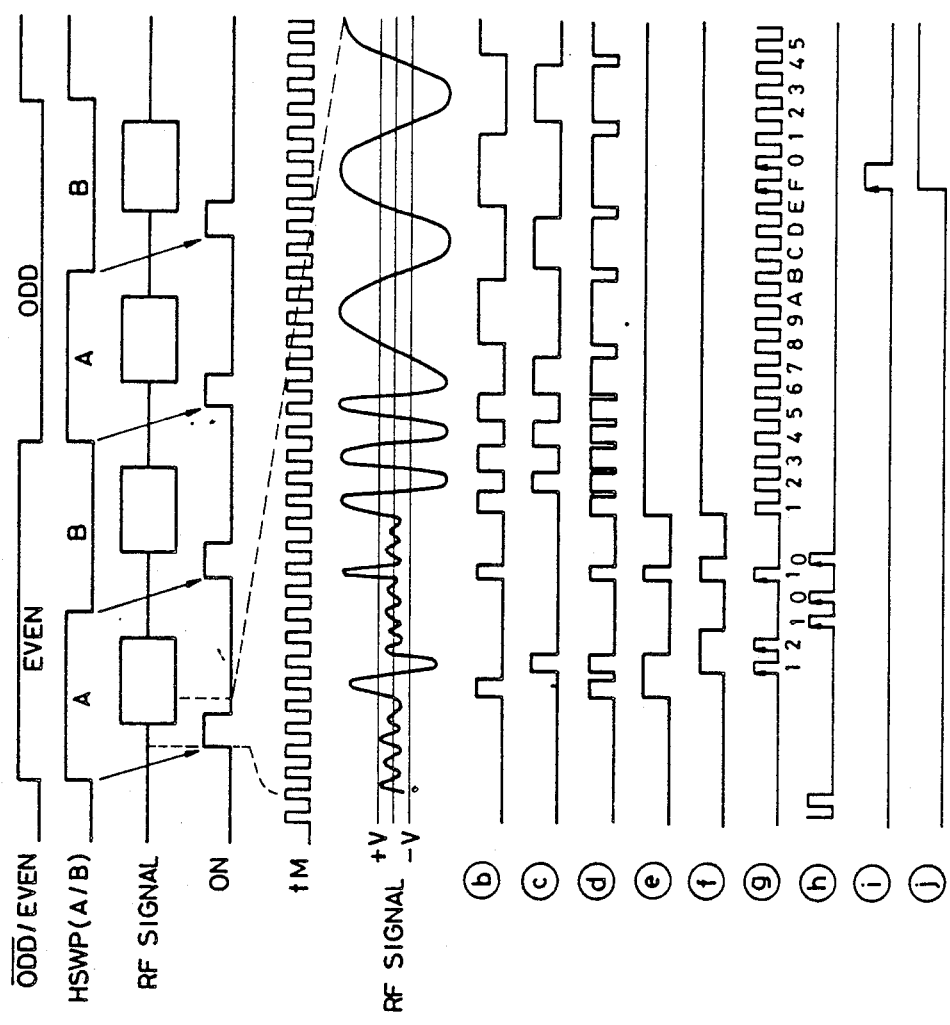
FIG. 7 is a timing chart showing the waveforms of signals generated in various parts of the system shown in FIG. 6.

FIG. 7 is a timing chart showing the waveforms of signals generated at various parts of the head touch detector circuit shown in FIG. 5 when it is fed with an RF signal having the waveform depicted in FIG. 7(a).

In the presence of a signal to be produced, the RF signal continuously provides amplitudes exceeding the range of ±V, whereas in the absence of a signal to be reproduced (i.e., in the area where neither head contacts the tape) the RF signal seldom has amplitudes exceeding the range of ±V. The value of ±V are set in such a way that they can be clearly distinguished from noise components.

In response to an input RF signal having the waveform shown in FIG. 7(a), the comparator 1—1 will produce an output having the waveform shown in FIG. 7(b) and the comparator 1-2 produces an output having the waveform shown in FIG. 7(c). The OR gate 1-3 will produce an output having the waveform shown in FIG. 7(d) which is the logical sum of (b) and (c). As is clear from (d), the output of the gate 1-3 is incompletely gated and any undesired portions of this output are eliminated by the integrator circuit such that the D input of the D FF 1-5 is fed with a signal having the waveform shown in FIG. 7(e).

As a result, a signal having the waveform shown in FIG. 7(f) appears at the Q output of the D FF 1-5. Since the basic clock $f_M$ passes through the AND gate 1-7 as long as the Q output remains high, the AND gate 1-7 will output a signal having the waveform depicted in FIG. 7(g). A signal having the waveform depicted in FIG. 7(h) will appear at the output of the AND gate 1-8.

Any noise component that slightly exceeds the range of ±V and any incompletely gated portions can be rejected by the integrator circuit but a noise impulse having a large amplitude cannot be rejected by this circuit.

Signals having the waveforms shown in FIGS. 7(g) and (h) are applied to the UP and DOWN inputs, respectively, of the up-down counter 1-9. When a predetermined number of counts are attained, the up-down counter 1-9 will produce a carry having the waveform depicted in FIG. 7(i) which is sent to the CY output. In response to this event, the D FF 1-11 will store the state of its D input and produce a signal at the Q output which rises as shown in FIG. 7(j).

In the manner described above, any small noise or incomplete gating can be eliminated by the integrator circuit, whereas any large noise can be rejected by the up-down counter 1-9 which achieves control of the duration of time. This provides a clear-cut distinction between the case where a signal is actually reproduced because of contact between tape and head and the case where no signal is reproduced in the absence of tape-to-head contact. In other words, head touch detection can be accomplished in a precise manner.

Figure 8:
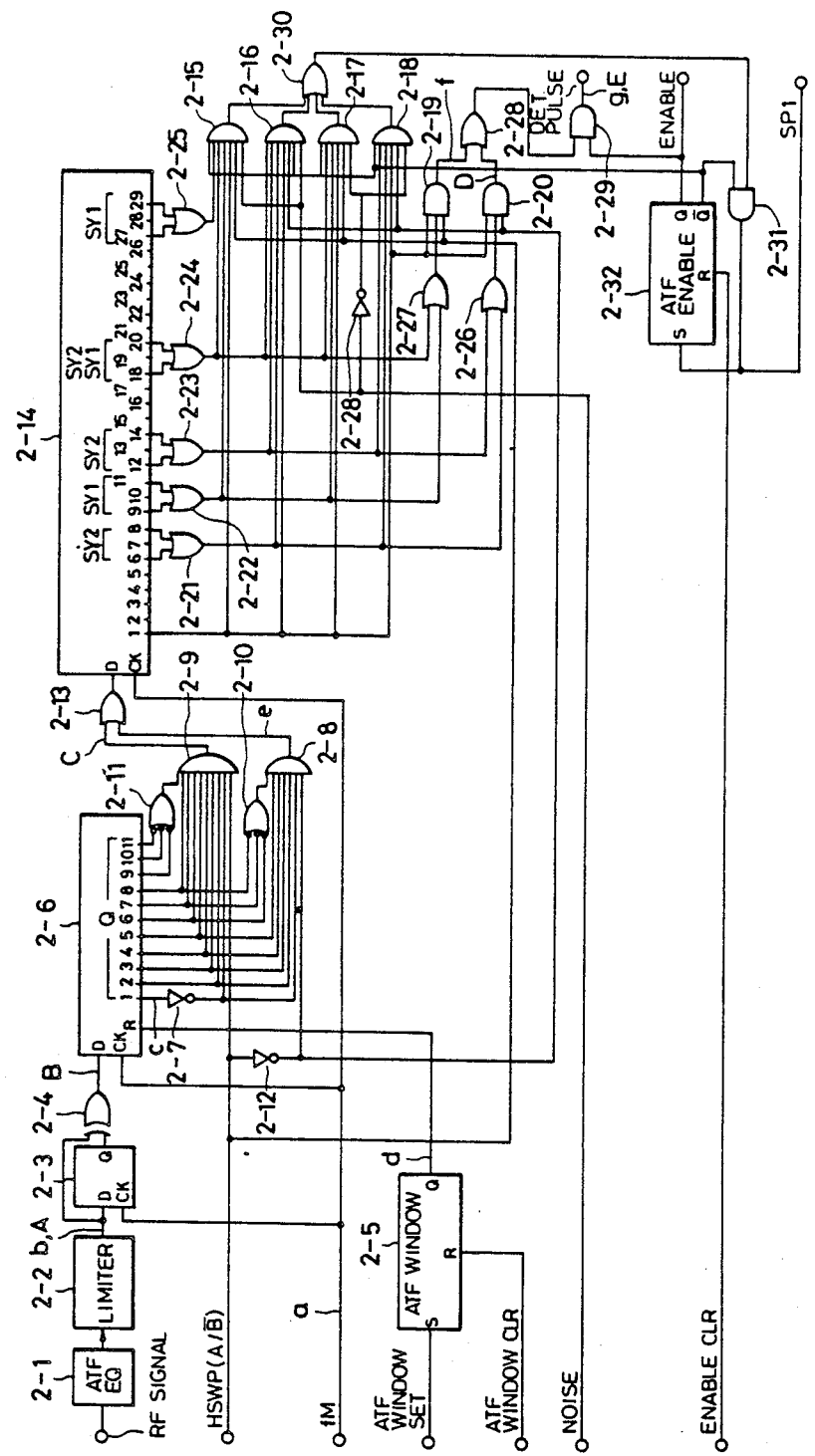
FIG. 8 is a block diagram showing a specific configuration of another part of the system shown in FIG. 2.

FIG. 8 shows a specific configuration of the sync detector circuit 202.

The sync detector circuit 202 receives at its inputs an RF signal, HSWP (A/B) signal, basic clock $f_M$, ATF window set signal, ATF window clear signal, noise signal and an enable clear signal.

An ATF equalizer 2-1 that is supplied with an RF signal from the reproduction amplifier 15 (FIG. 1) emphasizes the frequency band of ATF sync signal (400–900 kHz) and sends the so processed RF signal to a limiter 202. In the limiter 2—2, the RF signal is converted to a digital signal which is high (H) if the amplitude of the input signal is greater than a specified level, and is low (L) in the opposite case.

The output of the limiter 2—2 is supplied both to the D input of a D FF 2-3 which is fed with the basic clock $f_M$ at its CK input and to one input of an EXCLUSIVE (D) OR gate 2-4. The other input of EOR gate 2-4 is fed with the Q output of the D FF 2-3 so that the combination of EOR gate 2-4 and D FF 2-3 will constitute a phase inversion detector circuit.

The ATF window set signal is supplied to the S input of an ATF window latch 2-5 that is fed with an ATF window clear signal at its R input, and an ATF window signal is produced from the Q output of the ATF window latch 2-5.

The output of the EOR gate 2-4 is supplied to the D input of a 11-stage shift register 2-6 that is fed with the basic clock $f_M$ and the ATF window signal from the latch 2-5 at its CK and R inputs, respectively. The $Q_1$ output of the shift register 2-6 is supplied to AND gates 2-8 and 2-9 through an inverter 2-7; the $Q_2$–$Q_5$ outputs of the register are supplied to AND gates 2-8 and 2-9; the $Q_6$–$Q_8$ outputs are supplied to a NOR gate 2-10 and the AND gate 2-9; and the $Q_9$–$Q_{11}$ outputs are supplied to a NOR gate 2-11. The outputs of NOR gates 2-10 and 2-11 are supplied to AND gates 2-8 and 2-9, respectively. The AND gate 2-8 is also fed with an HSWP (A/B) signal that has been inverted by an inverter 2-12, whereas the AND gate 2-9 is fed with an univerted HSWP (A/B) signal. The outputs of AND gates 2-8 and 2-9 are supplied to the two inputs of an OR gate 2-13.

The output of the OR gate 2-13 is supplied to the D input of a 29-stage shift register 2-14 that is fed with the basic clock $f_M$ at its CK input. The $Q_1$ output of the shift register 2-14 is supplied to the input of each of AND gates 2-15 to 2-20; the $Q_6$–$Q_8$ outputs of the shift register which will become high upon reception of a sync 2 signal are supplied to the input of an OR gate 2-21; the $Q_9$–$Q_{11}$ outputs which will become high upon reception of a sync 1 signal are supplied to the input of an OR gate 2-22; the $Q_{12}$–$Q_{14}$ which will become high upon reception of a sync 2 signal are supplied to the input of an OR gate 2-23; the $Q_{18}$–$Q_{20}$ outputs which will become high upon reception of sync 1 and 2 signals are supplied to the input of an OR gate 2-24; and the $Q_{27}$–$Q_{29}$ which will become high upon reception of a sync 1 signal are supplied to the input of an OR gate 2-25.

The output of OR gate 2-21 is supplied to the inputs of AND gates 2-16 and 2-18 and to the input of OR gate 2-26; the output of OR gate 2-22 is supplied to the inputs of AND gates 2-15 and 2-17 and to the input of OR gate 2-27; the output of OR gate 2-23 is supplied to the inputs of AND gates 2-16 and 2-18 and to the input of AND gate 2-26; the output of OR gate 2-24 is supplied to the inputs of AND gates 2-15 to 2-18 and to the input of OR gate 2-27; and the output of OR gate 2-25 is supplied to the input of AND gate 2-15. The outputs of OR gates 2-26 and 2-27 are supplied to the inputs of AND gates 2-20 and 2-19, respectively.

The AND gates 2-15, 2-17 and 2-19 are supplied with an HSWP (A/B) signal, whereas AND gates 2-16, 2-18 and 2-20 are supplied with an HSWP (A/B) signal that has been inverted by the inverter 2-12. The AND gates 2-15 and 2-16 are also fed with a noisy signal, whereas the AND gates 2-17 and 2-18 are also fed with a noisy signal that has been inverted by an inverter 2-28.

The outputs of AND gates 2-19 and 2-20 are supplied to an OR gate 2-28, and the output of the OR gate 2-28 is supplied to an AND gate 2-29 from which it is sent out as a detection pulse signal. The outputs of AND gates 2-15 to 2-18 are applied to an OR gate 2-30, and the output of OR gate 2-30 is fed to an AND gate 2-31 from which it is sent out as a sampling signal SP1 and forwarded to the S input of an ATF enable latch 2-32 which is fed with an enable clear signal at the R input. The Q output of the ATF enable latch 2-32 is both sent out as an enable signal and supplied to the input of AND gate 2-29. The Q output of the latch 2-32 is supplied to the inputs of AND gates 2-15 to 2-18 and 2-31 so as to control their gating operation.

Having the configuration described above, the sync detector circuit 2-2 operates as follows.

The limiter 2-2 outputs a digital signal that corresponds to ATF sync 1 and sync 2 in the RF signal, and in accordance with the phase inversion of this digital signal, one clock period of the output of EOR gate 2-4 will become low (L). Shift register 2-6 which receives the output of EOR gate 2-4 at the D input will pick up the contents of this D input in response to the rising edge of the basic clock $f_M$ which is applied to the CK input when the window signal that is supplied to the R input from the ATF window latch 2-5 is at a high level, and the picked up input is sent to the $Q_1$ output. Upon each subsequent rising of the basic clock $f_M$, the D input is shifted in successive stages to be sent to $Q_2$-$Q_{11}$ outputs. In other words, the shift register 2-6 delays the output of EOR gate 2-4 by 1-11 clock periods before it is sent to the $Q_1$-$Q_{11}$ outputs.

When the $Q_1$ output is at a low level (indicating a change in its level), it is applied to AND gates 2-8 and 2-9 through inverter 2-7. When any one of the $Q_6$-$Q_8$ outputs has become low in level, it is passed through a NAND gate 2-10 to provide one high (H) input for the AND gate 2-8. The $Q_2$-$Q_5$ outputs are high unless there is a change in its level. If, in this instance, the HSWP (A/B) signal is low, it is inverted by inverter 2-12 to apply a high input to the AND gate 2-8.

If the conditions described above are met, all the inputs to AND gate 2-8 are high, producing a high output. Therefore, if these conditions are not met, the output of AND gate 2-8 remains low and will not change during a minimum of 4 clock periods. Instead, the output will change during 5-7 clock periods and half the period of sync 2 signal for the case where the HSWP (A/B) is low and reproduction is effected by B head 1B is detected. In practice, the sync 2 signal has a frequency of $f_3$ (=784 kHz=$f_M$/12), so the duration of time during which no change occurs in the output of AND gate 2-8 is equivalent to (six clock periods) but in consideration of such factors as the timing of clock pulses and jitter, a margin of +1 clock period is allowed.

The AND gate 2-8 outputs a pulse that becomes low in level for one clock period at every half of the period of sync 2 signal. Being processed as in the case of sync 2, sync 1 signal having a frequency of $f_2$ (=520 kHz=$f_M$/18) is detected from the output of AND gate 2-9 if the HSWP (A/B) signal is high (i.e., reproduction is effected by A head 1A). In this case, the output of AND gate 2-9 will remain unchanged for seven clock periods and changes in state during 8-10 clock period.

The sync 2 signal is produced from the AND gate 2-8 when the HSWP (A/B) signal is low, and the sync 1 signal is produced from the AND gate 2-9 when the HSWP (A/B) signal is high. Each of these sync signals is passed through the OR gate 2-13 and fed to the D input of the shift register 2-14.

The 29-stage shift register 2-14 stores the state of its D input in response to the rising edge of an input clock signal and sends the memory to the Q1 output. Upon every application of a clock in subsequent stages, the memory is shifted and sent to $Q_2$-$Q_{29}$ outputs. Therefore, the state of D input procuded at $Q_1$-$Q_{29}$ outputs has been delayed by 1-29 clock periods.

When there is a change in the $Q_1$ output of shift register 2-14, the level of this output becomes high. If, in the case of detection of sync 2 signal ($f_3$=780 kHz=1/12 $f_M$), thaere occurs a change one half period before the $Q_1$ output, the OR gate 2-21 produces a high output. If athere occurs a change one period after $Q_1$ output, the OR gate 2-23 will produce a high output. Therefore, output of OR gate 2-26 becomes high if there is a change one half period and/or one period before the $Q_1$ output. The output of OR gate 2-26 is applied to the input of AND gate 2-20 together with the $Q_1$ output of the shift register 2-14 and the HSWP (A/B) signal. The foregoing explanation can be summarized as follows: in the case of detection of sync 2, the $Q_1$ output becomes high when the D input is delayed by one clock period after detection of sync 2 by AND gate 2-8, and if the change that has occurred one half period before $Q_1$ output and the change that has occurred one period before $Q_1$ output are applied simultaneously to the input of AND gate 2-20 (the first change is passed through OR gates 2-21 and 2-26 whereas the second change is passed through OR gates 2-23 and 2-26), the output of AND gate 2-20 becomes high so as to produce a high output from OR gate 2-28.

The outputs of OR gates 2-21, 2-23 and 2-24 connected to the output of 29-stage shift register 2-14 become high when sync 2 is detected; therefore, when the noisy signal is at a low level, the output of AND gate 2-18 becomes high and is passed through OR gate 2-30 and AND gate 2-31, from which it is produced as a sampling signal SP1; at the same time, the output from AND gate 2-31 is applied to the S input of ATF enable latch 2-32 so that its Q output becomes high while the Q output becomes low. The Q output of latch 2-32 not only serves as an enable signal; it is also applied to AND gate 2-29 which then produces a detection pulse signal as its output.

Also referring to the case of detection of sync 2, if the noisy signal is high, the output of AND gate 2-16 becomes high and the same operations as described above will proceed.

In the case of detection of sync 1, the outputs of OR gates 2-22, 2-24 and 2-25 become high; if the noisy signal is at a low level, the output of AND gate 2-17 becomes high, and if the noisy signal is at a high level, the output of AND gate 2-15 becomes high. The operations that follow are the same as described in the previous paragraphs.

In short, decision of sync detection is made either at 3 or 4 points depending upon the level of the noisy signal.

Figure 9:
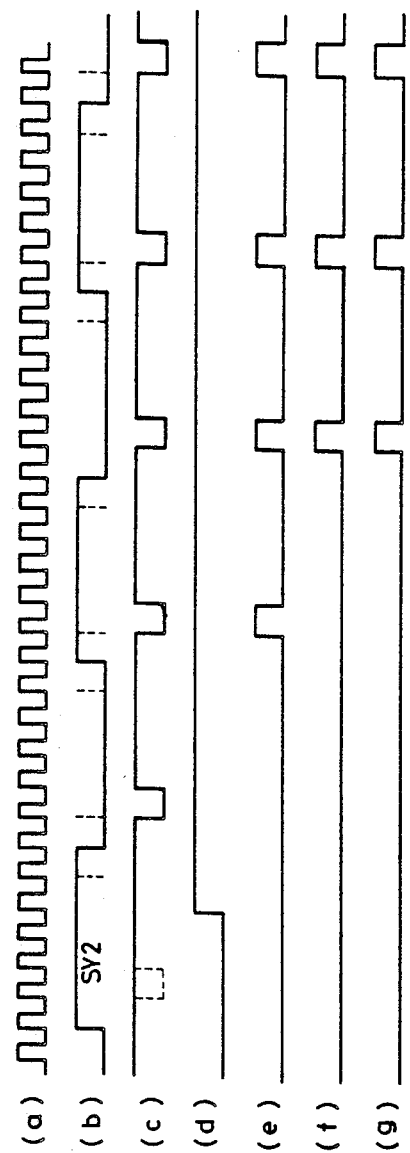
FIGS. 9 and 10 are timing charts showing the waveforms of signals generated in various parts of the system shown in FIG. 8.

FIG. 9 is a timing chart showing the waveforms of the signals that are generated in various parts of the system when detecting sync 2, with the individual waveforms being keyed to the symbols used in FIG. 8.

Figure 10:
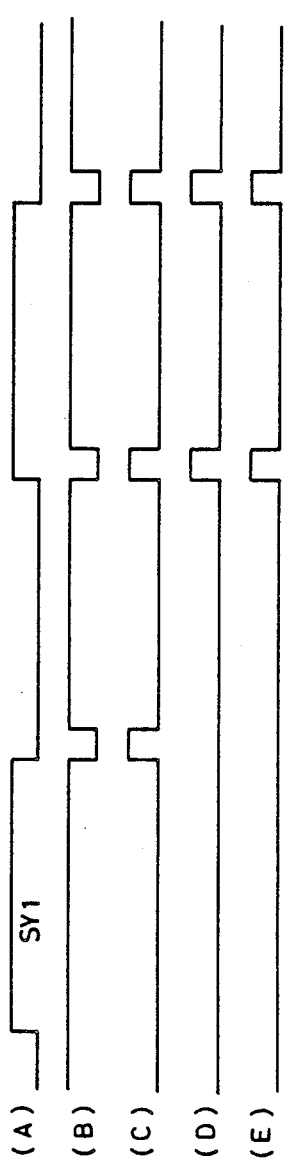

FIG. 10 is also a timing chart showing the waveforms of the signals that are generated in various parts of the system when detecting sync 1, with the individual waveforms being keyed to the symbols used in FIG. 8.

Figure 11:
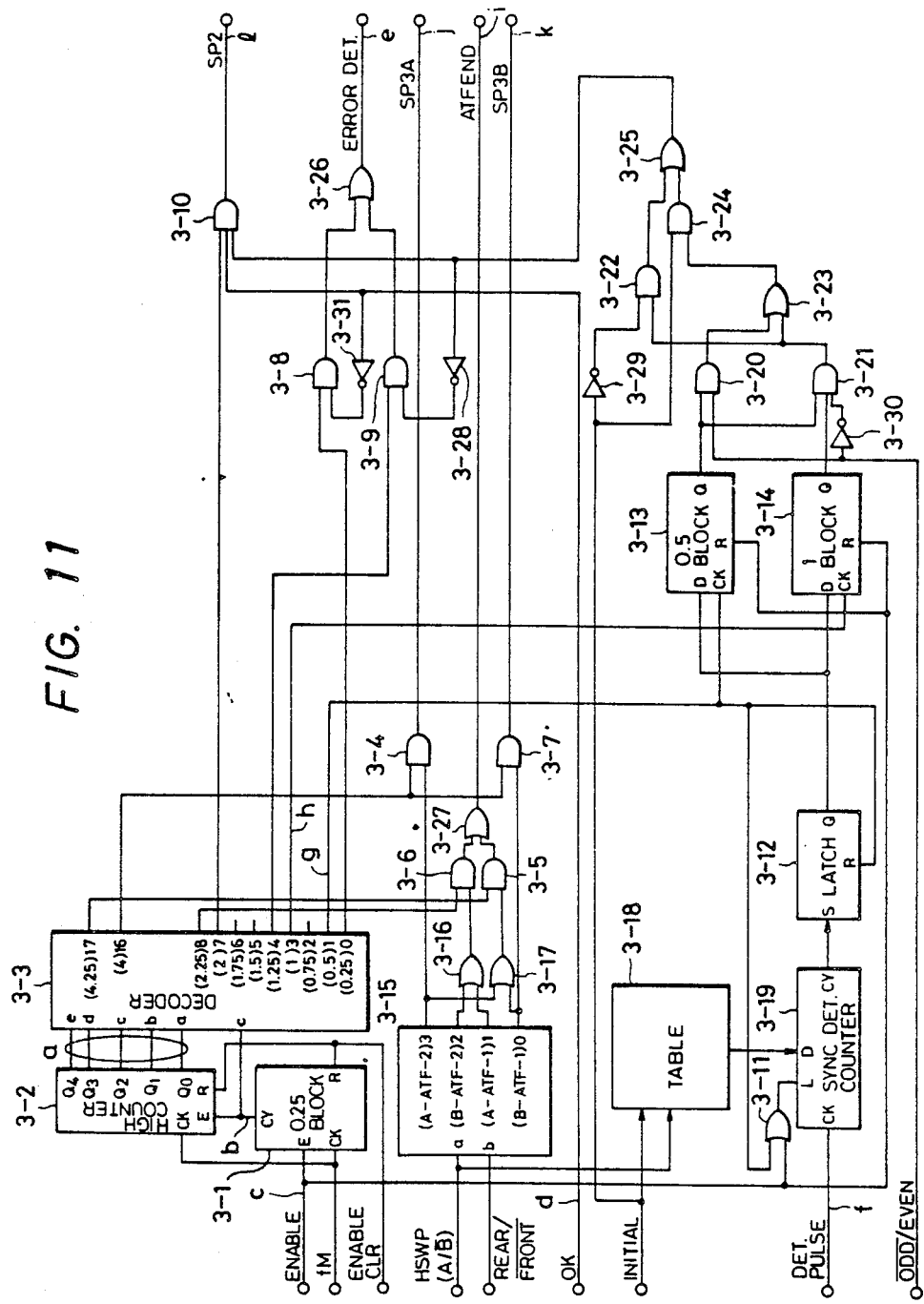
FIG. 11 is a circuit diagram showing a specific configuration of still another part of the system shown in FIG. 2.

FIG. 11 shows a specific configuration of the ATF timing generator 203. The generator 203 is fed at its inputs an ODD/EVEN signal, a basic clock $f_M$, an HSWP(A/B) signal, an enable signal, an enable clear signal, a rear/front signal, an OK signal, an initial signal, and a pulse detection signal.

As shown in FIG. 11, a 0.25-blcock counter 3-1 receives an enable signal, a basic clock $f_M$ and an enable clear signal at the E, CK and R inputs, respectively. After counting 0.25 blocks equivalent to 9.5 μs, the CY output of the counter 3-1 becomes high and is fed both to the E input of a high counter 3-2 and to the C input of a decoder 3-3.

The high counter 3-2 receives a basic clock $f_M$ and an enable clear signal at the CK and R inputs, respectively, and counts up after each 0.25 blocks. The $Q_0$-$Q_4$ ($2^0$-$2^4$) outputs of the counter 3-2 are fed into the decoder 3-3.

The decoder 3-3 serves to decode each of the time signals it receives. Only when the C input is high do 0–8, 16 and 17 outputs becomes actrive and the 0–8 outputs will produce 0.25–2.25 block signals at intervals of 0.25 blocks while the 16 and 17 outputs produce 4- and 4.25-block signals, respectively.

The outputs of decoder 3-3 are fed into gates 3-4 to 3-11 and the 0.5-block signal is supplied both to the R input of a latch 3-12 and to the CK input of a D FF 3-13 while the 1-block signal is supplied to the CK input of a D FF 3-14.

A decoder 3-15 receives an HSWP (A/B) signal and a rear/front signal at its inputs and serves to decode the location of an ATF signal being presently reproduced. It produced B-ATF-1, A-ATF-1, B-ATF-2 and A-ATF-2 signals at the 0–3 outputs, respectively, which are supplied not only to gates 3-4 and 3-7 but also to gates 3-16 and 3-17.

A table 3-18 is fed with an HSWP (A/B) signal and an initial signal at its inputs, and in response to these signals it changes the present threshold value it has for sync detection and sets the appropriate value in a sync detection counter 3-19. Depending upon the HSWP (A/B) value, one of the two threshold values are set, one being for detection of sync 1 when reproduction is conducted with head A and the other being for detection of sync 2 when head B is in action. Each of the two threshold values occupies 50% of the number of consecutive sync patterns, provided that it occupies 60% of the number of consecutive sync 2 patterns when the initial signal is at a low level. The sync detection counter 3-19 counts the number of pulse detection signals and its CY output is supplied to the S input of a latch 3-12.

The other components of the ATF timing generator 203 are gates 3-20 to 3-27 and inverters 3-28 to 3-3.

The generator 203 produces a sampling signal SP2 at the output of gate 3-10, an error detection signal at the output of gate 3-26, a sampling signal SP3A at the output of gate 3-4, an ATF END signal at the output of gate 3-27, and a sampling signal SP3B at the output of gate 3-7.

Having the configuration described above, the ATF timing generator 203 will operate in the following manner. When the sync detector circuit 202 generates a sampling signal SP1, the 0.25-block counter 3-1 starts a counting operation in response to an enable signal becoming high in coincidence with the falling edge of SP1. The CY output of the counter 3-1 becomes high at intervals of 0.25 blocks. Decoder 303 decodes the state of high counter 3-2 and produces a high output only when the CY output of the counter 3-1 is high.

When the D output of decoder 3-3 appears (i.e., 0.25 blocks after the generation of a sampling signal SP1), the OK signal is at a low level if the sampled value of crosstalk level one adjacent track is less than one half the level of pilot signal on the on-track. Therefore, the D output of decoder 3-3 will not appear at the output of AND gate 3-8 which is fed with the OK signal via inverter 3-9. In the absence of an OK signal, AND gate 3-8 will produce a high (H) output which is sent to OR gate 3-26 and delivered therefrom as an error detection signal.

When the 1 output of decoder 3-3 becomes high, the processing performed after 0.5 block periods consists of applying this high output to the L input of sync detection counter 3-19 via OR gate 3-11, as well as to the R input of latch 3-12 and to the CK input of D FF 3-13.

The D input of D FF 3-13 is fed with the CY output of sync detection counter 3-19 via latch 3-12, so after 0.5 block periods sampling is conducted by D FF 3-13 to see if the number of detection pulse signals generated exceeds a specified value. At the same time, latch 3-12 is reset and the table 3-18 sets an appropriate threshold value again in the sync detection counter 3-19.

When the 3 output of decoder 3-3 is high, the necessary processing is conducted after one block period and a D FF 3-14 which is fed at the D input with the CY output of sync detection counter 3-19 via latch 3-12 performs sampling to see if a specified number of pulses have been detected in one block period.

The combination circuit of gates 3-20, 3-21, 3-23 and inverter 3-30 determines whether a specified number of detection pulse signals have been generated based on an ODD/EVEN signal. If the Q outputs of both D FF 3-13 and 3-14 are at a high level in the case of application of an ODD signal, and if the Q output of D FF 3-13 is high in the case of application of an EVEN signal, it is concluded that a specified number of detection pulse signals have been generated and the output of OR gate 3-25 becomes high.

If the same processing is performed with the initial signal having a high level, OR gate 3-25 produces a high output via inverter 3-29 and AND gate 3-22.

If the sync detection counter 3-19 fails to detect a specified number of pulse signals, OR gate 3-25 will produce a low (L) output. Therefore, if a specified number of detection pulse signals have not been detected after 1.25 block periods (i.e., the 4 output of decoder 3-3 is at a high level), OR gate 3-26 will produce a high (H) error detection signal via inverter 3-28 and AND gate 3-9.

If the 7 output of decoder 3-3 is high (i.e., after 2 block periods), the generation of a specified number of detection pulse signals and the application of an OK signal will allow a sampling signal SP2 to be produced at the output of AND gate 3-10 for effecting sampling for the other adjacent track.

During replay with head A, if the 3 output of decoder 3-15 is high and after 4 block periods when the 16 output of decoder 3-3 is high, the ATF timing generator 203 produces a sampling signal SP3A as an output. During replay with head B, if the 0 output of decoder 3-15 is high and the 16 output of decoder 3-3 is also high, the generator 203 produces a sampling signal SP3B. These sampling signals are used to effect sampling of the level of the pilot signal on the on-track.

If the 17 output of decoder 3-3 is high and if ATF-2 is scanned with head A while ATF-1 is scanned with head B, the generator 2-3 produces an ATF END signal via gates 3-17, 3-5 and 3-27. If the 8 output of decoder 3-3 becomes high when ATF-1 is scanned with head A while ATF-2 is scanned with head B, the generator 2-3 will produce an ATF END signal via gates 3-16, 3-6 and 3-27.

Figure 12:
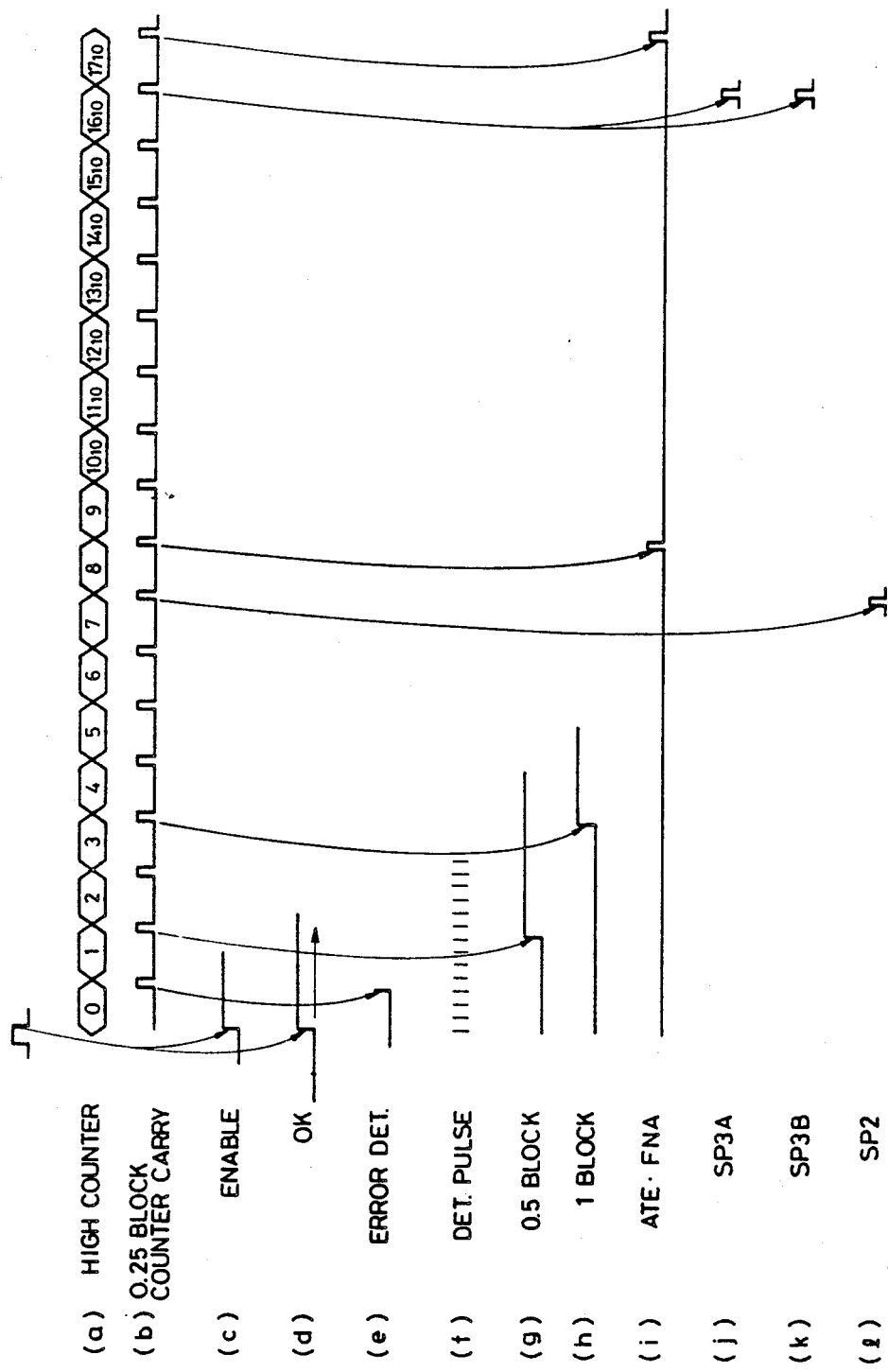
FIG. 12 is a timing chart showing the waveforms of signals generated in various parts of the system shown in FIG. 11.
Figure 14:
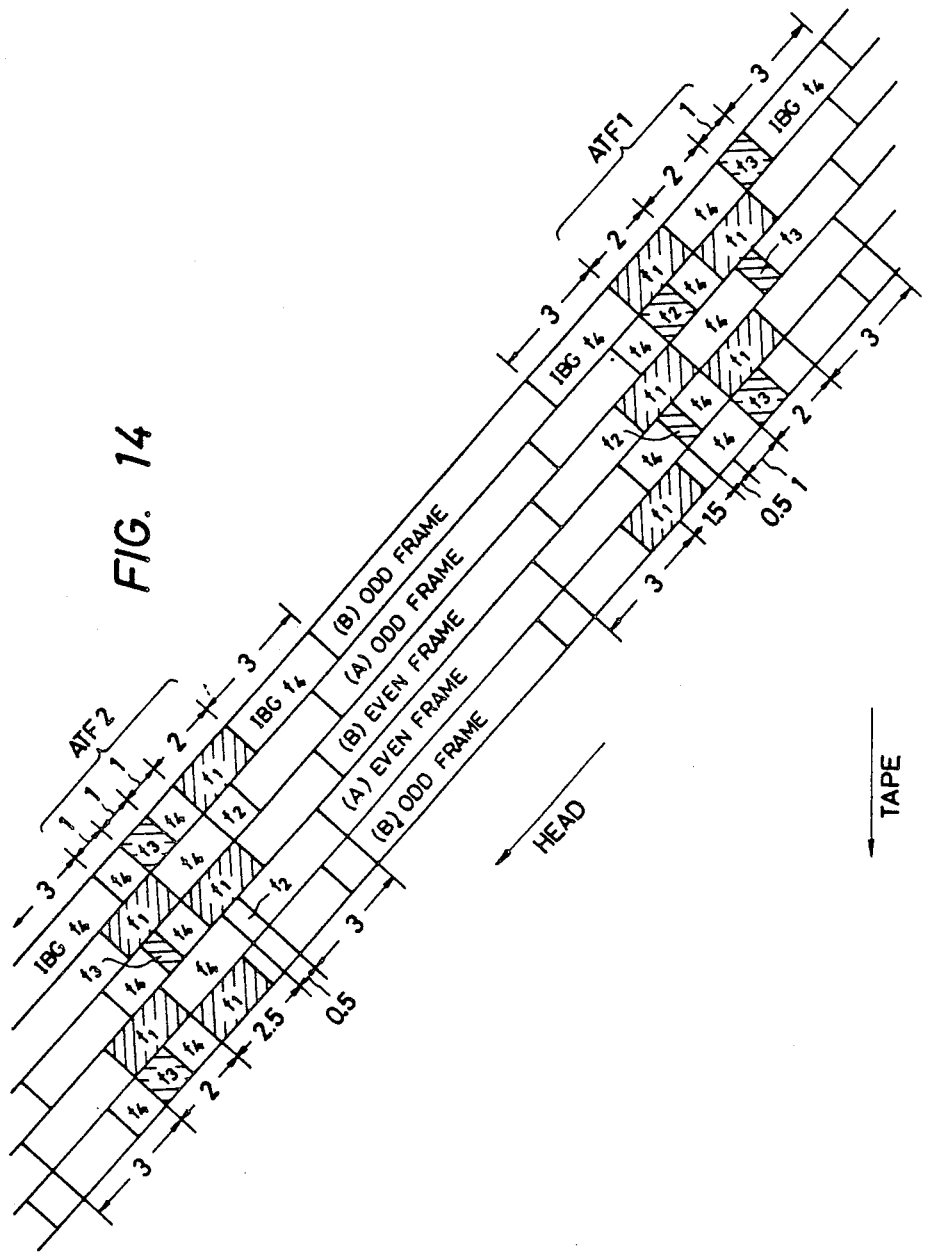
FIG. 14 is a diagram showing an ATF track pattern used in R-DAT.

FIG. 12 shows the waveforms of the signals generated at various parts of the system during the operations described above, with the individual waveforms being keyed to the symbols attached to the respective parts.

In the embodiment described on the foregoing pages, only the operation of the ATF signal processing unit is controlled with reference being made to the head portion of the signal to be reproduced. It will be readily understood by those skilled in the art that the operation of other signal processing units dealing with the processing of PCM data including SUB-1, PCM and SUB-2 can be controlled by the same procedures.

As described in the foregoing, according to the present invention, the level of the pilot signal on the on-track is retained and the so retained level is used to adjust the difference between the levels of crosstalk of pilot signals from the two tracks adjacent to the on-track. This eliminates the need to perform cumbersome adjusting operations in the manufacturing process and the variation in the difference between the levels of crosstalk from the two adjacent tracks that occurs as a result of variation in the output levels of a plurality of rotary heads can be automatically adjusted during the actual operation of the system. As a further advantage, these results can be attained by a very simple circuit configuration.

What is claimed is:

1. In a digital signal reproducing apparatus having at least two rotary heads for reproducing a plurality of signals on a recording medium, said plurality of signals containing a digital signal formed by performing pulse-code modulation (PCM) and time-base compression on an audio signal and a tracking pilot signal composed of a frequency signal with a small azimuth loss, said plurality of signals being recorded on each of a plurality of helical tracks in a predetermined format with respective recording regions of said plurality of signals in each track being independent of one another in a track direction, a position of the pilot signals recorded on any three consecutive tracks differing from each other, each of said rotary heads having a width greater than the width of each track on which it scans, and a capstan servo being controlled by a difference between levels of crosstalk of the pilot signals that are picked up by said rotary heads from two tracks adjacent to a track being scanned and reproduced by a first of said rotary heads, the improvement comprising:
means for sampling and holding a level of the pilot signal that is picked up by the rotary heads from the track being scanned; and
level adjusting means for adjusting a difference between levels of crosstalk of pilot signals from said two adjacent tracks with reference to said level;
means for sampling the levels of crosstalk from at least one of the adjacent tracks;
means for determining whether said levels of crosstalk sampled by said sampling means have been sampled correctly; and
output means responsive to said determining means for thereafter outputting the adjusted level difference, which is used as a reference for performing control on the capstan servo.

2. A digital signal reproducing apparatus according to claim 1 where said level adjusting means comprises a variable gain circuit the gain of which with respect to the difference between the levels of crosstalk of pilot signals from the two adjacent tracks is controlled in inverse proportion to the level of the pilot signal on the track being scanned.

3. A digital signal reproducing apparatus according to claim 1 where said level adjusting means comprises a variable gain circuit the gain of which with respect to the difference between the levels of crosstalk of pilot signals from the two adjacent tracks is controlled in proportion to the level of the pilot signal on the track being scanned.

4. A digital signal reproducing apparatus according to claim 1 wherein said level adjusting means is composed of a divider circuit which performs a division with the level of the pilot signal on the track being scanned by said first rotary head serving as a denominator and the difference between the levels of crosstalk of pilot signals from the two adjacent tracks serving as a numerator when the first rotary head is scanning, otherwise a level of the pilot signal on a track being scanned by one of said rotary heads other than said first rotary head is employed as the denominator.

5. In a signal reproducing device having a reproducing head for scanning a track on a recording medium having plural tracks, said device further having error signal means for generating a tracking error signal and means for controlling a position of said reproducing head in accordance with said tracking error signal, said error signal means comprising:
first means for detecting a first signal picked up from the track being scanned;
second means for detecting a difference between signals from tracks adjacent to said track being scanned and sampling said detected difference;
third means for adjusting a level of said difference in accordance with a level of said first signal to obtain said tracking error signal;
fourth means for determining whether said signals detected by said second means have been sampled correctly; and
fifth means responsive to said fourth means for thereafter outputting the level adjusted by said third means.

6. In a digital signal reproducing apparatus having at least two rotary heads for reproducing a plurality of signals on a recording medium, said plurality of signals containing a digital signal formed by performing pulse-code modulation (PCM) and time-base compression on an audio signal and a tracking pilot signal composed of a frequency signal with a small azimuth loss, said plurality of signals being recorded on each of a plurality of helical tracks in a predetermined format with respective recording regions of said plurality of signals in each track being independent of one another in a track direction, a position of the pilot signals recorded on any three consecutive tracks differing from each other, each of said rotary heads having a width greater than the width of each track on which it scans, and a capstan servo being controlled by the difference between levels of crosstalk of the pilot signals that are picked up by said rotary heads from two tracks adjacent to a track being scanned and reproduced by a first of said rotary heads, the improvement comprising:
- means for sampling and holding a level of the pilot signal that is picked up by the rotary heads from the track being scanned; and
- level adjusting means for adjusting a difference between the levels of crosstalk of pilot signals from said two adjacent tracks with reference to said held level and thereafter outputting the adjusted level difference, which is used as a reference for performing control on the capstan servo;
- wherein said level adjusting means is composed of a divider circuit which performs a division with the level of the pilot signal on the track being scanned by said first rotary head serving as a denominator and the difference between the levels of crosstalk of pilot signals from the two adjacent tracks serving as a numerator when the first rotary head is scanning, otherwise a level of the pilot signal on a track being scanned by one of said rotary heads other than said first rotary head is employed as the denominator.

7. In a signal reproducing device having a plurality of reproducing heads for scanning a plurality of tracks on a recording medium, said device further having error signal means for generating a tracking error signal and means for controlling a position of said reproducing head in accordance with said tracking error signal, said error signal means comprising:
- first means for detecting a first signal picked up from a track being scanned by a first of said plurality of reproducing heads;
- second means for detecting a second signal from at least one track adjacent to said track being scanned; and
- third means for adjusting a level of said second signal in accordance with a level of said first signal to obtain said tracking error signal;
- wherein said third means is composed of a divider circuit which performs a division with the level of a pilot signal on the track being scanned by said first reproducing head serving as a denominator and a difference between levels of crosstalk of pilot signals from two adjacent tracks serving as a numerator when the first reproducing head is scanning, otherwise a level of the pilot signal on a track being scanned by one of said reproducing heads other than said first reproducing head is employed as the denominator.

* * * * *